US011115632B2

(12) United States Patent
 Ishikawa

(10) Patent No.: US 11,115,632 B2
(45) Date of Patent: Sep. 7, 2021

(54) IMAGE PROCESSING DEVICE, IMAGE PROCESSING METHOD, PROGRAM, AND PROJECTION SYSTEM

(71) Applicant: SONY CORPORATION, Tokyo (JP)

(72) Inventor: Tomoya Ishikawa, Ibaraki (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/772,642

(22) PCT Filed: Dec. 5, 2018

(86) PCT No.: PCT/JP2018/044641
§ 371 (c)(1),
(2) Date: Jun. 12, 2020

(87) PCT Pub. No.: WO2019/124070
PCT Pub. Date: Jun. 27, 2019

(65) Prior Publication Data
US 2021/0084268 A1   Mar. 18, 2021

(30) Foreign Application Priority Data

Dec. 19, 2017 (JP) .............................. JP2017-242675

(51) Int. Cl.
*H04N 9/31* (2006.01)
(52) U.S. Cl.
CPC ......... *H04N 9/3147* (2013.01); *H04N 9/3185* (2013.01); *H04N 9/3188* (2013.01)
(58) Field of Classification Search
CPC .... H04N 9/3158; H04N 9/3108; H04N 9/317; H04N 9/31; H04N 9/3179; H04N 9/3182; H04N 9/3185; H04N 9/3188
(Continued)

(56) References Cited

U.S. PATENT DOCUMENTS

2005/0271299 A1   12/2005 Ajito et al.
2006/0152680 A1   7/2006 Shibano
(Continued)

FOREIGN PATENT DOCUMENTS

JP   2005-347813 A   12/2005
JP   2006-221599 A   8/2006
(Continued)

OTHER PUBLICATIONS

Jul. 8, 2020, European Search Report issued for related EP application No. 18890127.6.
(Continued)

*Primary Examiner* — Sherrie Hsia
(74) *Attorney, Agent, or Firm* — Paratus Law Group, PLLC

(57) ABSTRACT

There is provided an image processing device, an image processing method, a program, and a projection system that reduce processing in a case where images based on an equidistant cylindrical image are projected using a plurality of projectors. The image processing device of an aspect of the present technology generates a second equidistant cylindrical image whose center pixel is equal to a center pixel of each of projection regions of a plurality of projectors in a first equidistant cylindrical image and that includes pixels within an angle range including the each of the projection regions, as an image used to generate each of projection images that are projected from the plurality of projectors. The present technology is applicable to a computer that causes the plurality of projectors to project images.

14 Claims, 17 Drawing Sheets

(58) Field of Classification Search
USPC ...... 348/744–747, 806, 807; 353/30, 48, 69, 353/70, 94
See application file for complete search history.

(56) References Cited

U.S. PATENT DOCUMENTS

| | | | |
|---|---|---|---|
| 2008/0136976 A1* | 6/2008 | Ajito .................... | H04N 9/3185 348/745 |
| 2019/0260976 A1* | 8/2019 | Ishii ..................... | H04N 9/3194 |
| 2020/0366876 A1* | 11/2020 | Takao .................. | H04N 9/3185 |

FOREIGN PATENT DOCUMENTS

| | | |
|---|---|---|
| JP | 2016-014720 A | 1/2016 |
| JP | 2017-138472 A | 8/2017 |

OTHER PUBLICATIONS

N. Shibano et al., Development of CyberDome-a scalable Immersive Multi Projection Display with Hemi-Spherical Screen, IDW '04, 2004, vol. 9, Issue 3, pp. 1431-1434.

* cited by examiner

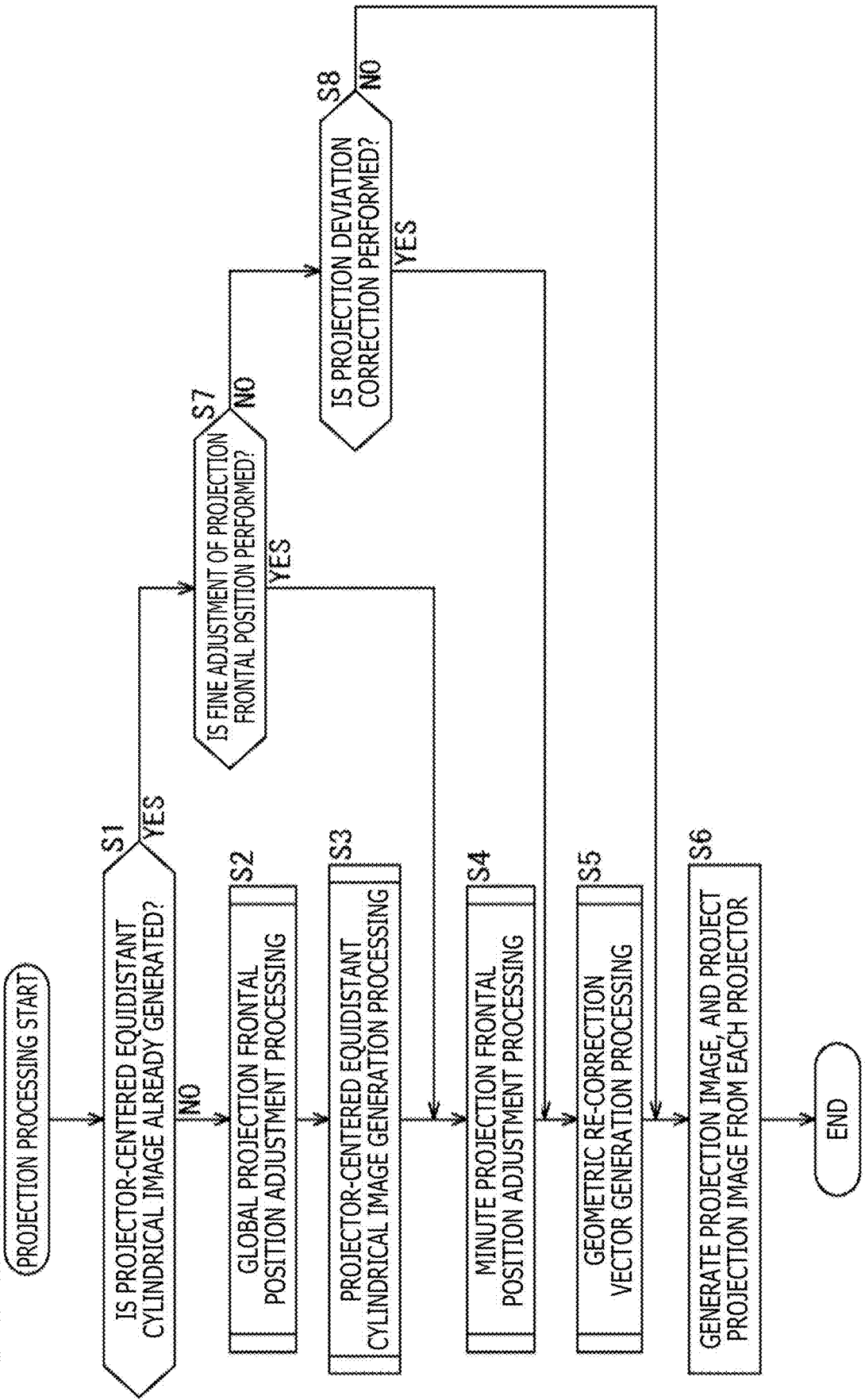

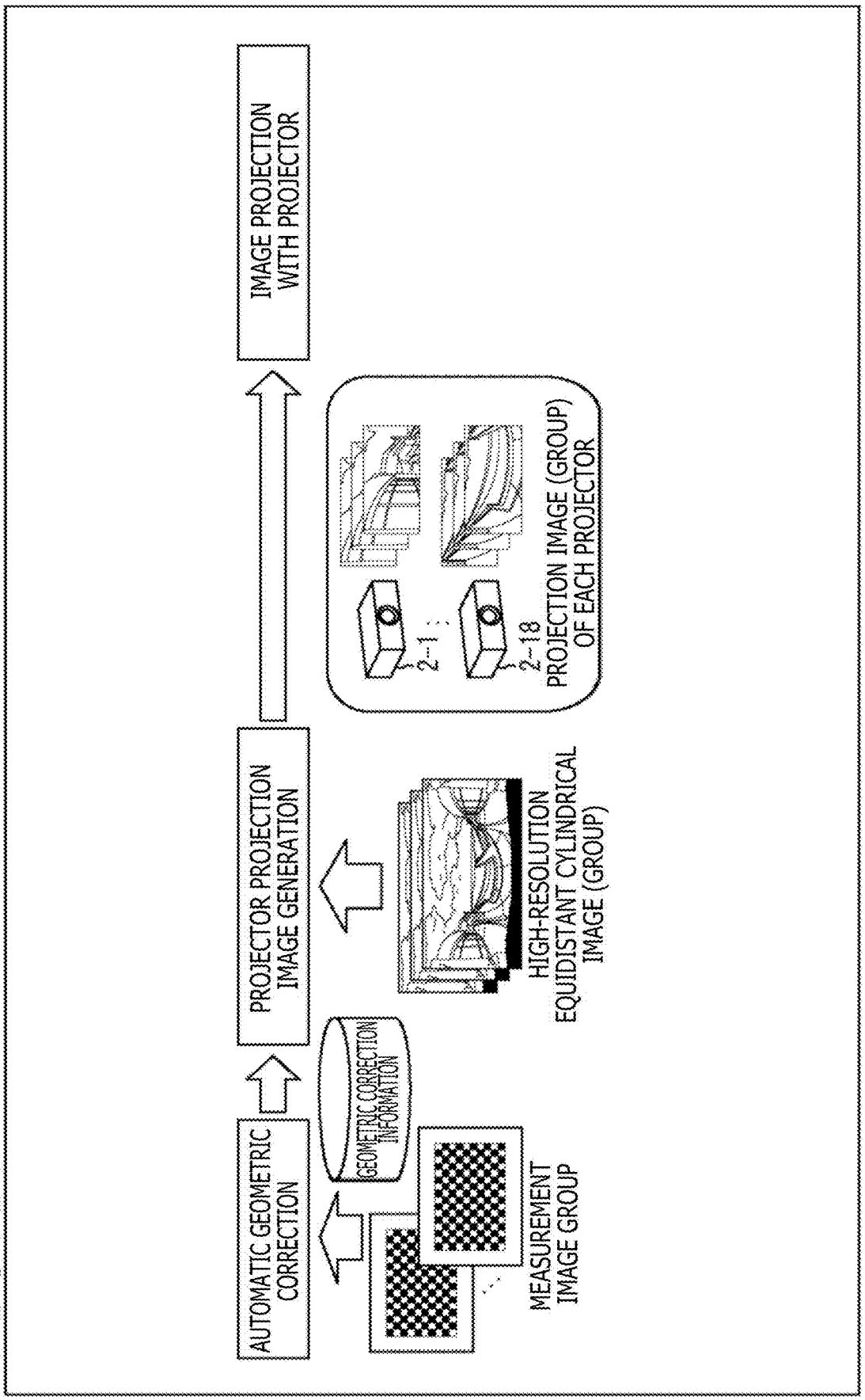

IMAGE PROCESSING DEVICE, IMAGE PROCESSING METHOD, PROGRAM, AND PROJECTION SYSTEM

CROSS REFERENCE TO PRIOR APPLICATION

This application is a National Stage Patent Application of PCT International Patent Application No. PCT/JP2018/044641 (filed on Dec. 5, 2018) under 35 U.S.C. § 371, which claims priority to Japanese Patent Application No. 2017-242675 (filed on Dec. 19, 2017), which are all hereby incorporated by reference in their entirety.

TECHNICAL FIELD

The present technology relates to image processing devices, image processing methods, programs, and projection systems and particularly to an image processing device, an image processing method, a program, and a projection system that can reduce processing in a case where images based on an equidistant cylindrical image are projected using a plurality of projectors.

BACKGROUND ART

A multi-projection system in which plural projectors that uses an equidistant cylindrical image with high resolution as an input are linked to each other to project partial regions of the equidistant cylindrical image is available.

In the multi-projection system, processing that measures a positional relationship between the projectors, a screen, and a point of view and generates geometric correction information used for generating a projection image of each projector is performed. The geometric correction information is information for associating a pixel in the projection image of each projector with a pixel in the equidistant cylindrical image serving as a projection source.

CITATION LIST

Patent Literature

[PTL 1]
JP 2016-014720A

SUMMARY

Technical Problems

In a case where the following changes occur, it is generally necessary to regenerate a projection image of each projector.

(1) A region desired to be projected in the equidistant cylindrical image is changed.

(2) A positional relationship between the projectors, the screen, and the point of view is changed.

Another available method is to divide the equidistant cylindrical image with high resolution into plural rectangular regions to provide images of rectangular regions as the images for the projectors, without providing the projection images. In a case where the images are provided with this method, due to characteristics of the equidistant cylindrical image, a region assigned to a projector that projects an image near a pole becomes extremely large. Because the region assigned to each projector varies in size, variation in throughput and a data amount increases.

The present technology is conceived in view of such a situation, and its object is to reduce processing for projecting images based on an equidistant cylindrical image using a plurality of projectors.

Solution to Problems

An image processing device of an aspect of the present technology includes a generator that generates a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plurality of projectors.

A projection system of another aspect of the present technology includes the following: a screen having a curved projection surface; a plurality of projectors that projects projection images generated by an image processing device on the screen; and the image processing device including a generator that generates a second equidistant cylindrical image whose center pixel is equal to a center pixel of each of projection regions of a plurality of projectors in a first equidistant cylindrical image and that includes pixels within an angle range including the each of the projection regions, as an image used to generate each of projection images that are projected from the plurality of projectors, and a projection controller that generates the projection images, based on the second equidistant cylindrical image and an image generation parameter including transformation information for transforming the center pixel of the each of the projection images to the center pixel of the second equidistant cylindrical image and information indicating an angle range of the second equidistant cylindrical image, and causes the plurality of projectors to project the projection images, respectively.

In the present technology, a second equidistant cylindrical image whose center pixel is equal to a center pixel of each of projection regions of a plurality of projectors in a first equidistant cylindrical image and that includes pixels within an angle range including the each of the projection regions, as an image used to generate each of projection images that are projected from the plurality of projectors, is generated.

Advantageous Effect of Invention

The present technology can reduce processing in a case where images based on an equidistant cylindrical image are projected using a plurality of projectors.

Note that the effect described herein is not necessarily limited and any effects described in the present disclosure may be provided.

BRIEF DESCRIPTION OF DRAWINGS

FIG. 16 is a flowchart explaining a series of image processing.

FIG. 17 is a drawing illustrating a flow of existing processing.

DESCRIPTION OF EMBODIMENT

Figure 1:
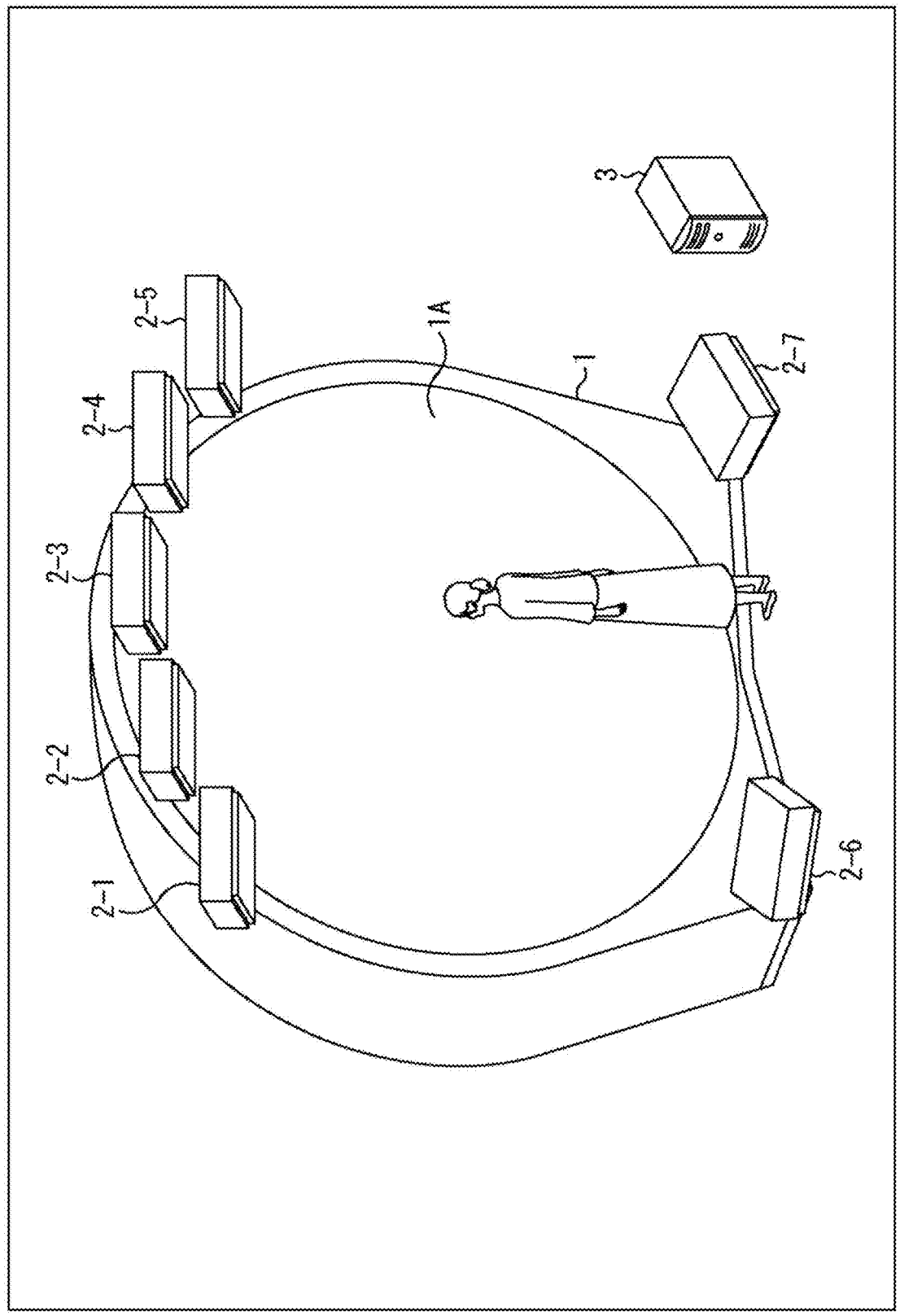
FIG. 1 is a view illustrating a configuration example of a multi-projection system according to an exemplary embodiment of the present technology.

Hereinafter, an exemplary embodiment of the present technology will be described. The description will be made in the following order.

1. Configuration of multi-projection system
2. Equidistant cylindrical image
3. Functions of image processing device
4. Configuration of image processing device
5. Whole flow of image processing
6. Projection frontal position adjustment processing
7. Projector-centered equidistant cylindrical image generation processing
8. Geometric re-correction vector generation processing
9. Operation of image processing device
10. Other examples <Configuration of Multi-Projection System>

FIG. 1 is a view illustrating a configuration example of a multi-projection system according to an exemplary embodiment of the present technology.

The multi-projection system in FIG. 1 includes a dome screen 1, projectors 2-1 to 2-7, and an image processing device 3. The projectors 2-1 to 2-7 are connected to the image processing device 3 through wired or wireless communication.

The dome screen 1 has a dome (spherical) projection surface 1A having a size that completely covers a view field of an observer standing in front of the dome screen 1.

Figure 2:
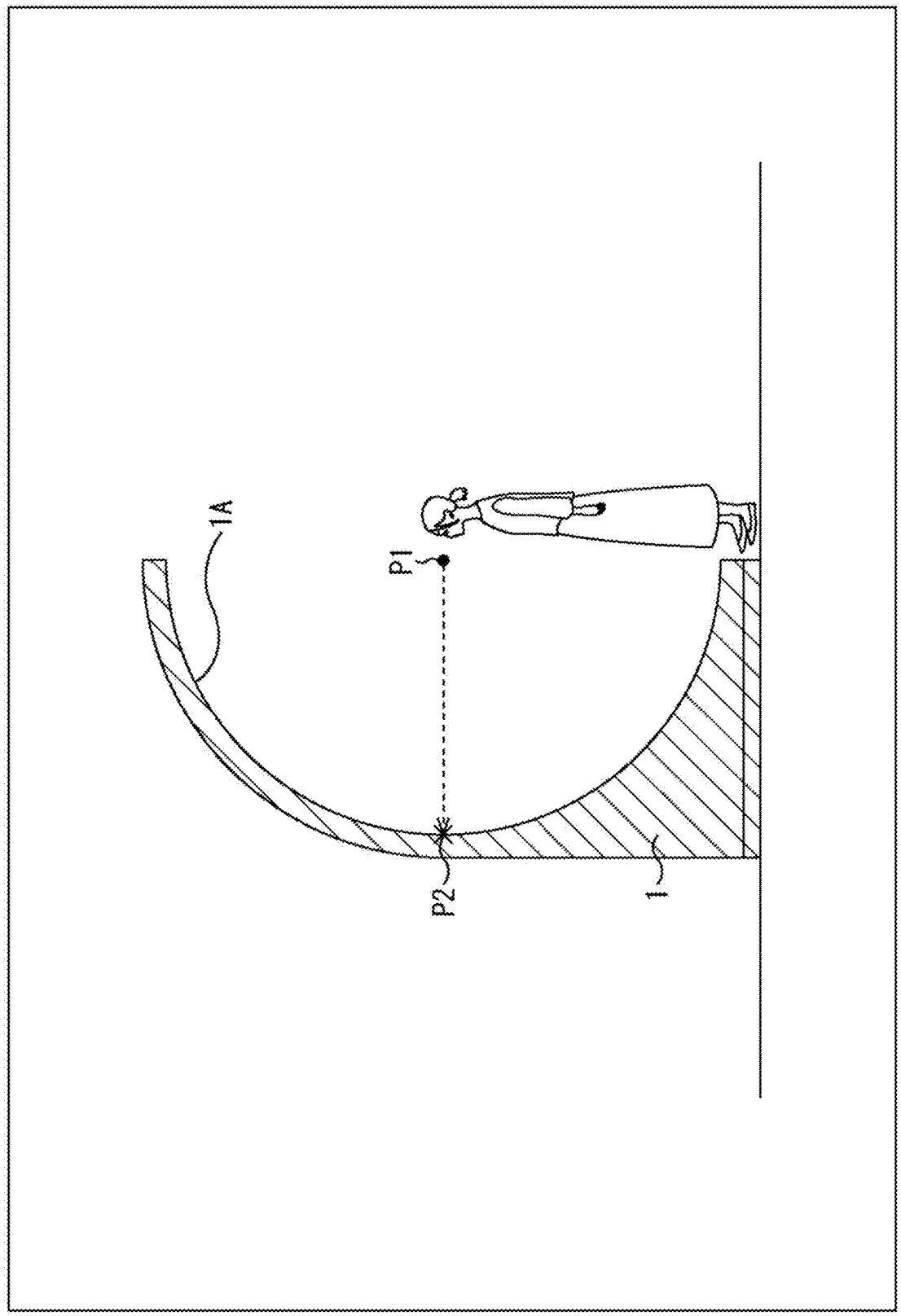
FIG. 2 is a view illustrating an example of a positional relationship between an observer and a dome screen.

As illustrated in FIG. 2, when the projection surface 1A is defined as a surface of a sphere, the observer stands at a position where a position P1 that is a center of the sphere serves as a viewing position to view an image projected on the projection surface 1A. A position P2 on the projection surface 1A present in a horizontal direction from the position P1, which is illustrated ahead of a broken line arrow in FIG. 2, is a frontal position in the projection surface 1A.

On the projection surface 1A, an image having a wide field angle whose horizontal field angle is 240 degrees and whose vertical field angle is 110 degrees, for example, is projected. The image covers a substantially whole viewing field. This allows the observer to have an impression as if he or she is surrounded by the image and to obtain a sense of immersion into content.

For example, content of moving images such as games and movies is provided. However, content of still images such as photographs shooting scenery may be provided.

Each of the projectors 2-1 to 2-7 projects a projection image that is an image for each projector on the dome screen 1, thereby presenting one image to the observer. The projection image of each projector is generated based on an image with high resolution configuring the moving image of the content to allow observation of one image without distortion at the point of view of the observer.

In an example in FIG. 1, among the projectors 2-1 to 2-7, the projectors 2-1 to 2-5 are installed near a ceiling of a room, and the projectors 2-6 and 2-7 are installed near a floor. Projection sections of the projectors 2-1 to 2-7 are respectively directed toward predetermined regions on the projection surface 1A.

FIG. 1 illustrates seven projectors, the projectors 2-1 to 2-7 but more projectors are installed in the multi-projection system.

Hereinafter, assume that 18 projectors, projectors 2-1 to 2-18, are installed. The projectors 2-8 to 2-18 besides the projectors 2-1 to 2-7 illustrated in FIG. 1 are also installed at predetermined positions in front of the dome screen 1 while their projection sections are respectively directed toward predetermined regions on the projection surface 1A. The number of projectors configuring the multi-projection system may be any number.

The image processing device 3 generates the projection image of each projector, based on each frame configuring the moving image of the content. The image processing device 3 outputs the projection image to each projector to project.

The image processing device 3 is a PC, for example. Instead of one PC, a plurality of PCs may configure the image processing device 3. Further, the image processing device 3 may be provided in a room different from a room in which the dome screen 1 is installed, without being provided near the dome screen 1 as illustrated in FIG. 1.

<Equidistant Cylindrical Image>

Figure 3:
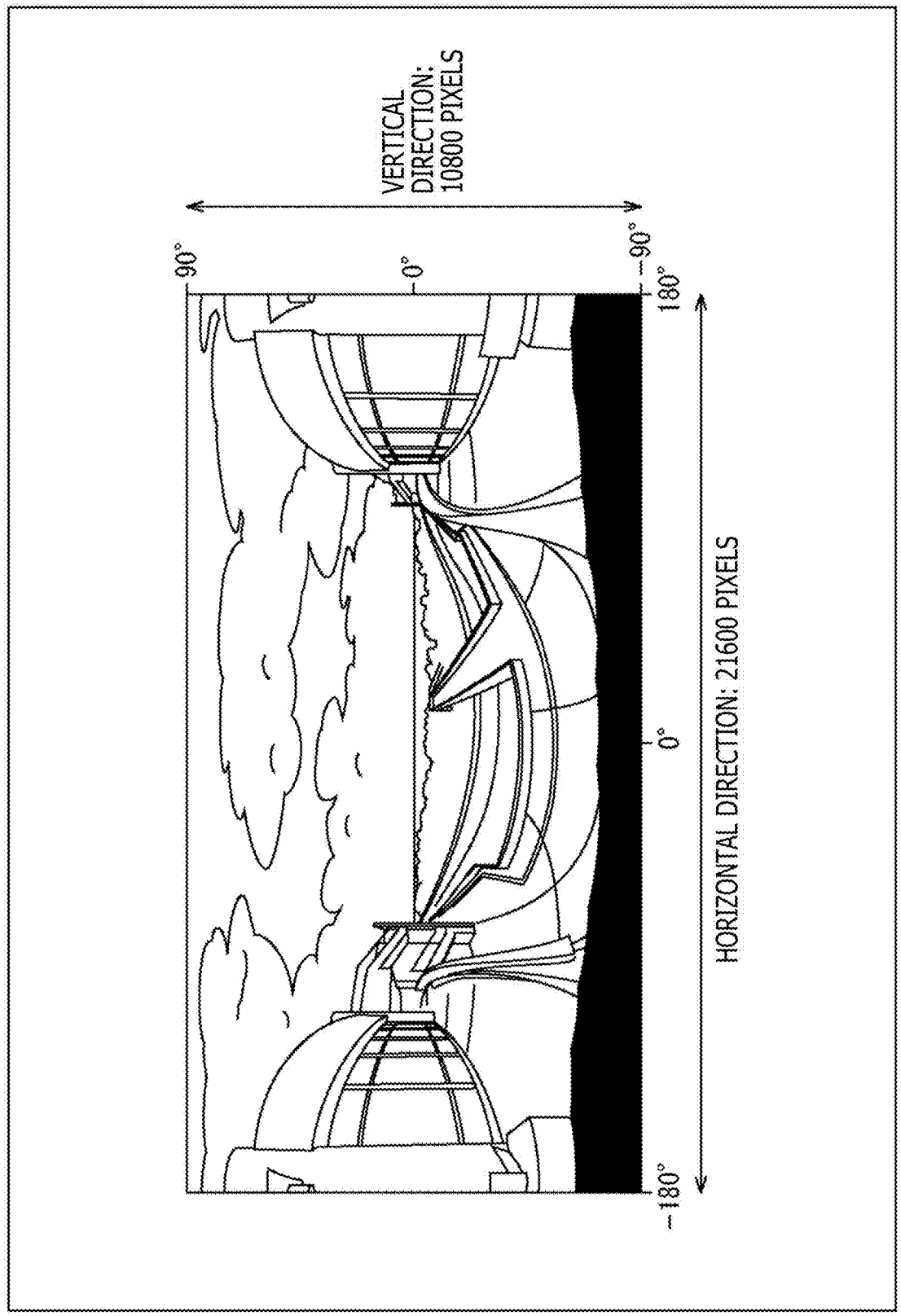
FIG. 3 is a view illustrating an example of one frame configuring a moving image of content.

FIG. 3 is a view illustrating an example of one frame configuring the moving image of content.

One frame configuring the moving image is an equidistant cylindrical image as illustrated in FIG. 3. The equidistant cylindrical image is an image used as a representation form of a celestial sphere image shot by a celestial sphere camera, for example. The moving image obtained by the image processing device 3 is, for example, a moving image including a wide field angle image such as the celestial sphere image shot by the celestial sphere camera.

In an example in FIG. 3, a horizontal field angle is set to 360 degrees from −180 degrees to 180 degrees, and a vertical field angle is set to 180 degrees from −90 degrees to 90 degrees. Further, the equidistant cylindrical image includes 21600 pixels along the horizontal direction and 10800 pixels along the vertical direction. Accordingly, a pixel number for a field angle of one degree is 60 (60 ppd (pixel per degree)).

The equidistant cylindrical image is an image whose latitudinal lines and longitudinal lines intersect at a right angle and at equal intervals. A position of each pixel is represented with latitude and longitude. Distortion is small near latitude of zero degrees. As being distant from the latitude of zero degrees, distortion in a lateral direction becomes large. In the equidistant cylindrical image in FIG.

3, buildings present near the camera are shot so as to be extended largely in the lateral direction. Sky and sea are shot in the front.

The image processing device 3 generates the projection image of each projector, based on the high-resolution equidistant cylindrical image that is such an equidistant cylindrical image whose field angle is wide and whose resolution is high. The field angles and the pixel number of the high-resolution equidistant cylindrical image are not limited to numerical values illustrated in FIG. 3.

As described above, the image projected on the dome screen 1 is the image whose horizontal field angle is 240 degrees and whose vertical field angle is 110 degrees. The projection image of each projector is generated based on an image of a partial region in the high-resolution equidistant cylindrical image.

The region used to generate the projection image is set according to a projection frontal position. The projection frontal position is a position on the high-resolution equidistant cylindrical image, which is projected at a frontal position on the projection surface 1A (the position P2 in FIG. 2).

The image processing device 3 is allowed to adjust the projection frontal position such that a predetermined position in the high-resolution equidistant cylindrical image is defined as the projection frontal position. An administrator of the multi-projection system adjusts the projection frontal position, for example. The projection frontal position may be switched according to an operation by the observer of the content.

Figure 4:
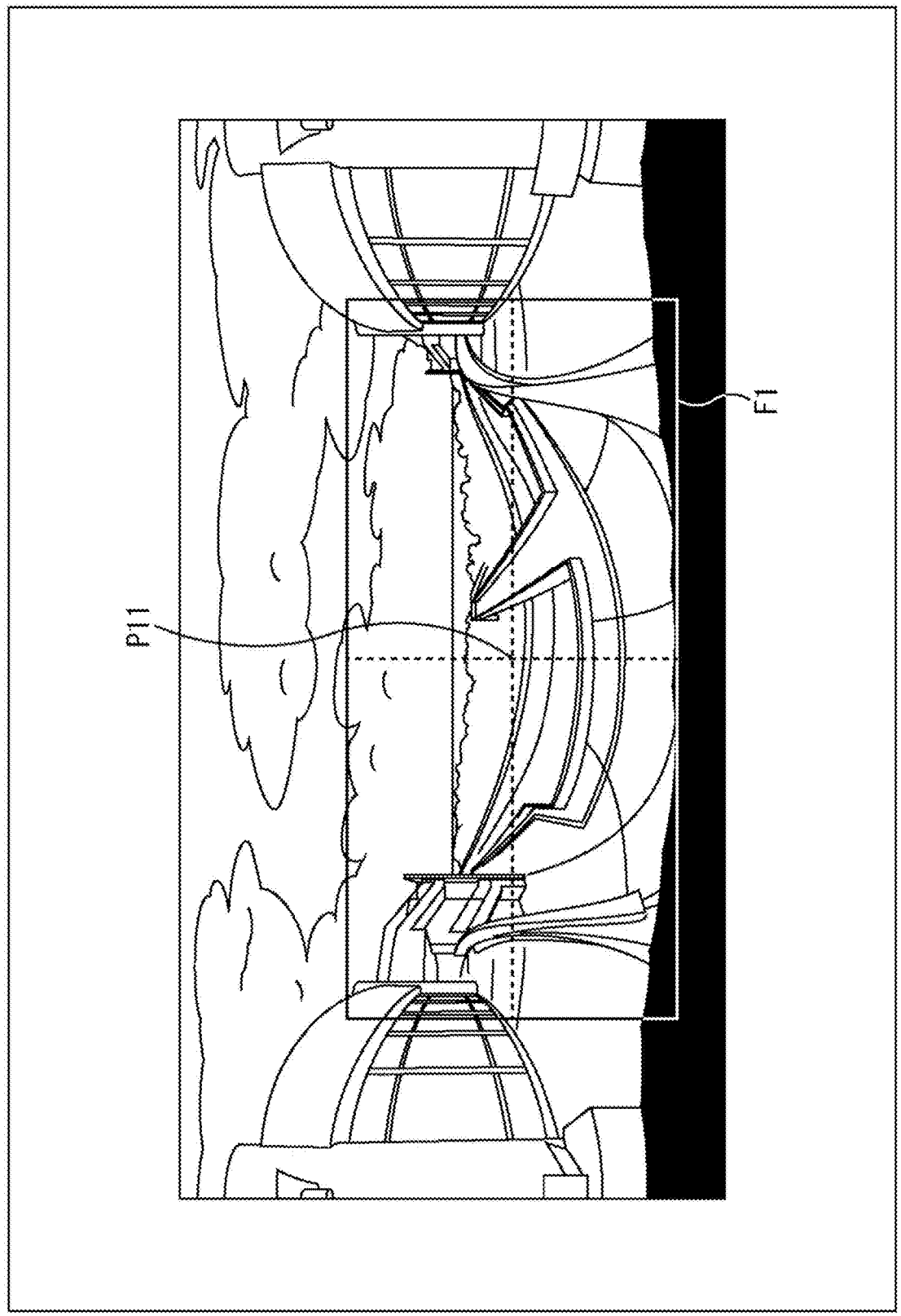
FIG. 4 is a view illustrating an example for setting a projection frontal position.

FIG. 4 is a view illustrating an example for setting the projection frontal position.

For example, a center of the high-resolution equidistant cylindrical image is set as a default projection frontal position. The projection frontal position is adjusted such that the default projection frontal position is modified from the center of the high-resolution equidistant cylindrical image to another position.

In a case where, for example, a position P11 in FIG. 4 is set as the projection frontal position, a range in a frame F1 whose horizontal field angle is 240 degrees and whose vertical field angle is 110 degrees with the position P11 as a reference is set as a projection range of the dome screen 1. The position P11 is a position slightly below the center of the high-resolution equidistant cylindrical image.

The projection image of each projector is generated using pixels in the rectangle region illustrated while being surrounded by the frame F1 and peripheral pixels.

Figure 5:
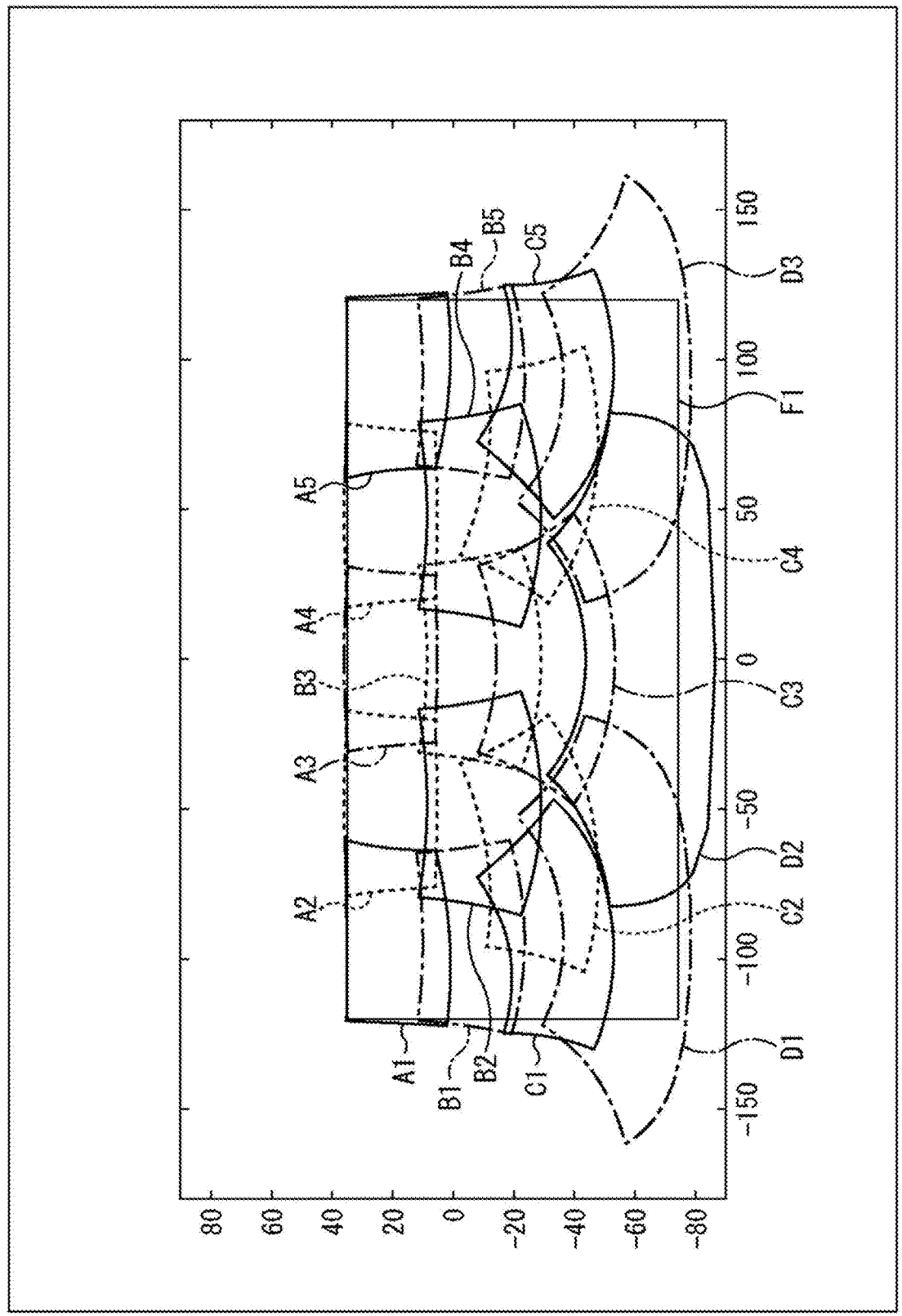
FIG. 5 is a view illustrating an example of a projection region of each projector.

FIG. 5 is a view illustrating an example of the projection region of each projector.

Regions A1 to A5 illustrated in an upper portion of the frame F1 are the projection regions of the projectors 2-1 to 2-5, respectively. Regions B1 to B5 illustrated near latitude of zero degrees are the projection regions of the projectors 2-6 to 2-10, respectively.

Regions C1 to C5 are the projection regions of the projectors 2-11 to 2-15, respectively. Regions D1 to D3 illustrated in a lower portion of the frame F1 are the projection regions of the projectors 2-16 to 2-18, respectively. Each projection region is represented so as to partly overlap with adjacent projection regions on the high-resolution equidistant cylindrical image.

The projection regions illustrated in FIG. 5 are respectively assigned to the projectors 2-1 to 2-18. Assuming that a positional relationship between the dome screen 1, the projectors 2-1 to 2-18, and the point of view is fixed, when the projection frontal position is set and the whole projection region indicated by the frame F1 is determined, the projection region assigned to each projector is determined.

In the image processing device 3, the projection image of each projector is generated to allow the projectors 2-1 to 2-18 to project images of the projection regions.

Figure 6:
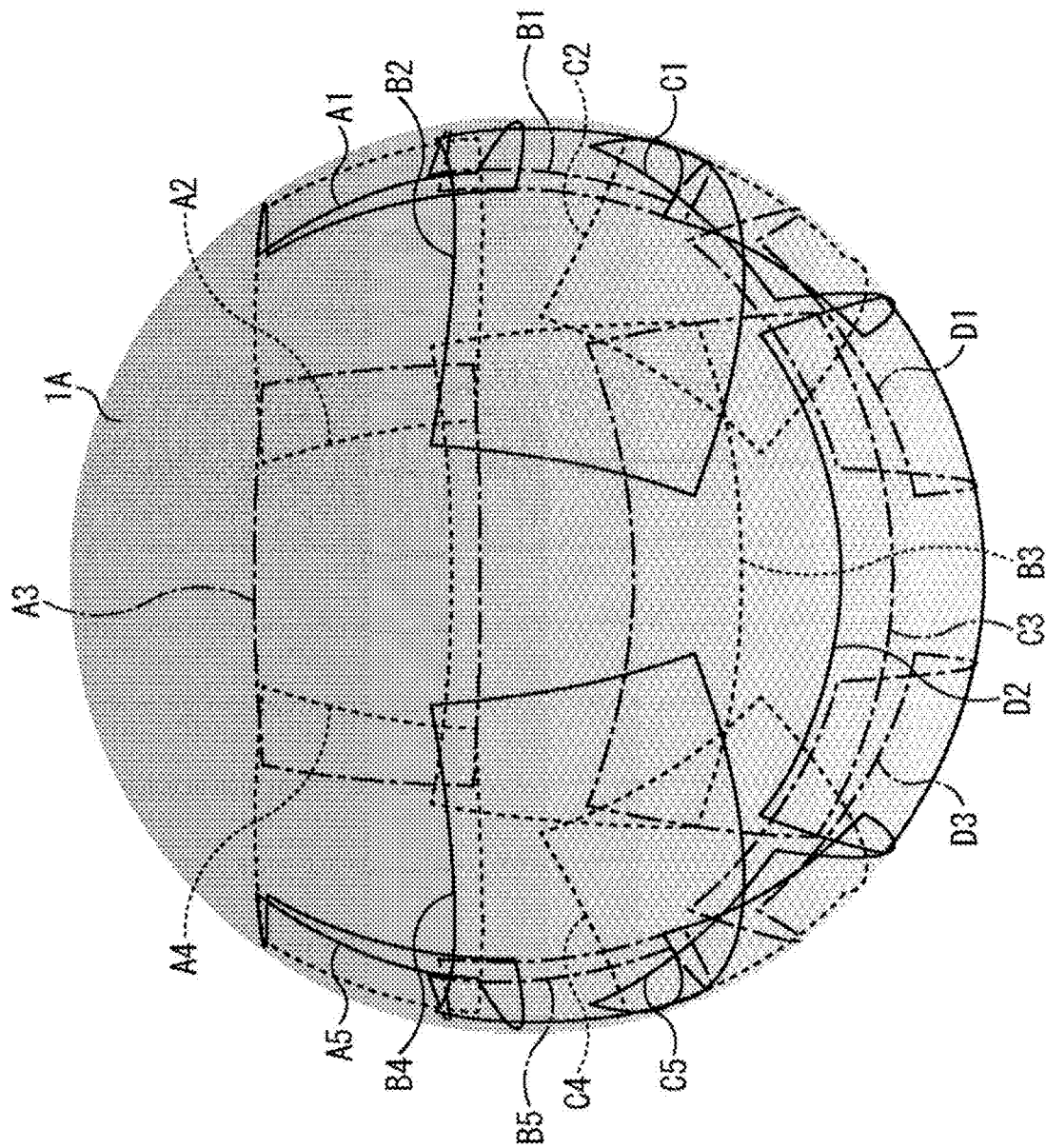
FIG. 6 is a view illustrating an example of projection regions on the dome screen.

FIG. 6 is a view illustrating an example of the projection regions of the projectors on the dome screen 1 (projection surface 1A).

A colored circle in FIG. 6 indicates a state of the projection surface 1A viewed from a rear surface side of the dome screen 1. For example, the projection images of the projectors 2-1 to 2-5 are projected to positions slightly above the frontal position in the projection surface 1A as indicated as the regions A1 to A5, respectively. The projection image of the projector 2-8 is projected in a region including the frontal position of the projection surface 1A as indicated as the region B3.

Figure 7:
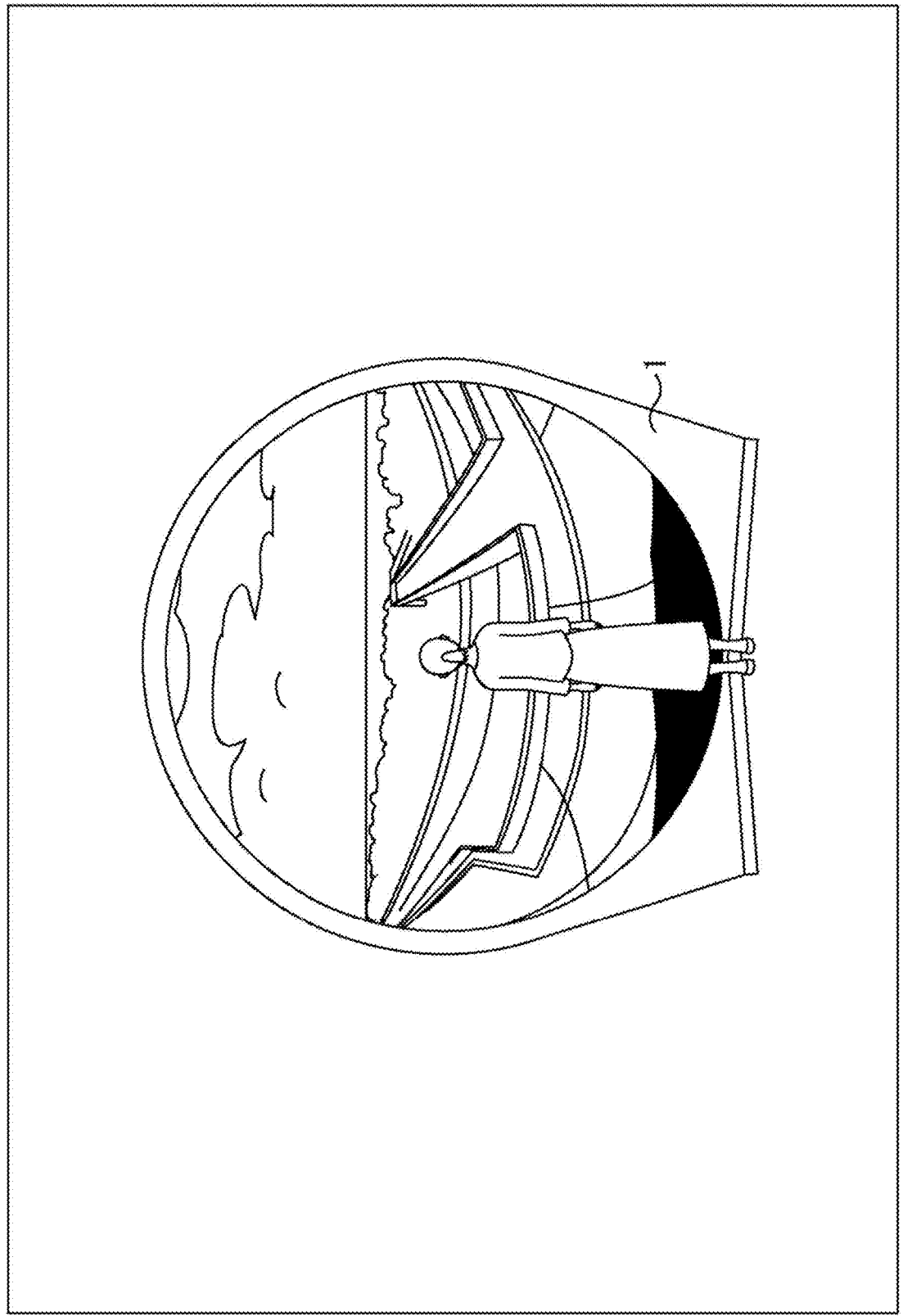
FIG. 7 is a view illustrating a projection state.

FIG. 7 is a view illustrating a projection state.

For example, in a case where the position P11 in FIG. 4 is set as the projection frontal position, by projecting the projection images from the projectors, the image in the range of the frame F1 as illustrated in FIG. 7 is presented to the observer. The position P11 in the high-resolution equidistant cylindrical image corresponds to the frontal position on the projection surface 1A.

In this manner, the presentation of the content by the multi-projection system is performed by projecting the image having the wide field angle that covers substantial a whole of the viewing field of the user using the plurality of projectors.

<Functions of Image Processing Device>

The image processing device 3 mainly includes the following functions.

(1) A function for adjusting the projection frontal position to be at any position (2) A function for performing fine adjustment of the projection frontal position without regenerating the projection image of each projector (3) A function for correcting projection deviation without regenerating the projection image of each projector As described above, the function of the above item (1) is a function that can adjust the position other than the center of the high-resolution equidistant cylindrical image to be the projection frontal position. For example, the default state that defines the center of the high-resolution equidistant cylindrical image (its latitude is zero degrees, and its longitude is zero degrees) as the projection frontal position can also be adjusted such that a position whose latitude is zero degrees and whose longitude is 180 degrees, which is completely opposite to the default state along the horizontal direction, is defined as the projection frontal position.

The function of the above item (2) is a function that enables fine adjustment of the projection frontal position as necessary. In general, in a case where the fine adjustment is further performed with respect to the projection frontal position after modification, it is necessary to generate the projection images according to the projection frontal position that has undergone the fine adjustment instead of the projection images of the projectors which are already generated. However, the image processing device 3 does not need this procedure.

The function of the above item (3) is a function that corrects projection deviation that occurs in a case where the positional relationship between the projectors, the screen, and the point of view is modified. The positional relationship between the projectors, the screen, and the point of view may be modified due to elapse of time or a change in temperature. Further, the positional relationship between the projectors, the screen, and the point of view is also modified when those positions are shifted due to, for example, maintenance, or setting of the point of view is modified.

In general, in a case where the projection deviation occurs, it is necessary to generate the projection images according to the positional relationship that has undergone correction of the projection deviation instead of the projection images of the projectors which are already generated. However, the image processing device 3 does not need this procedure.

<Configuration of Image Processing Device>

Figure 8:
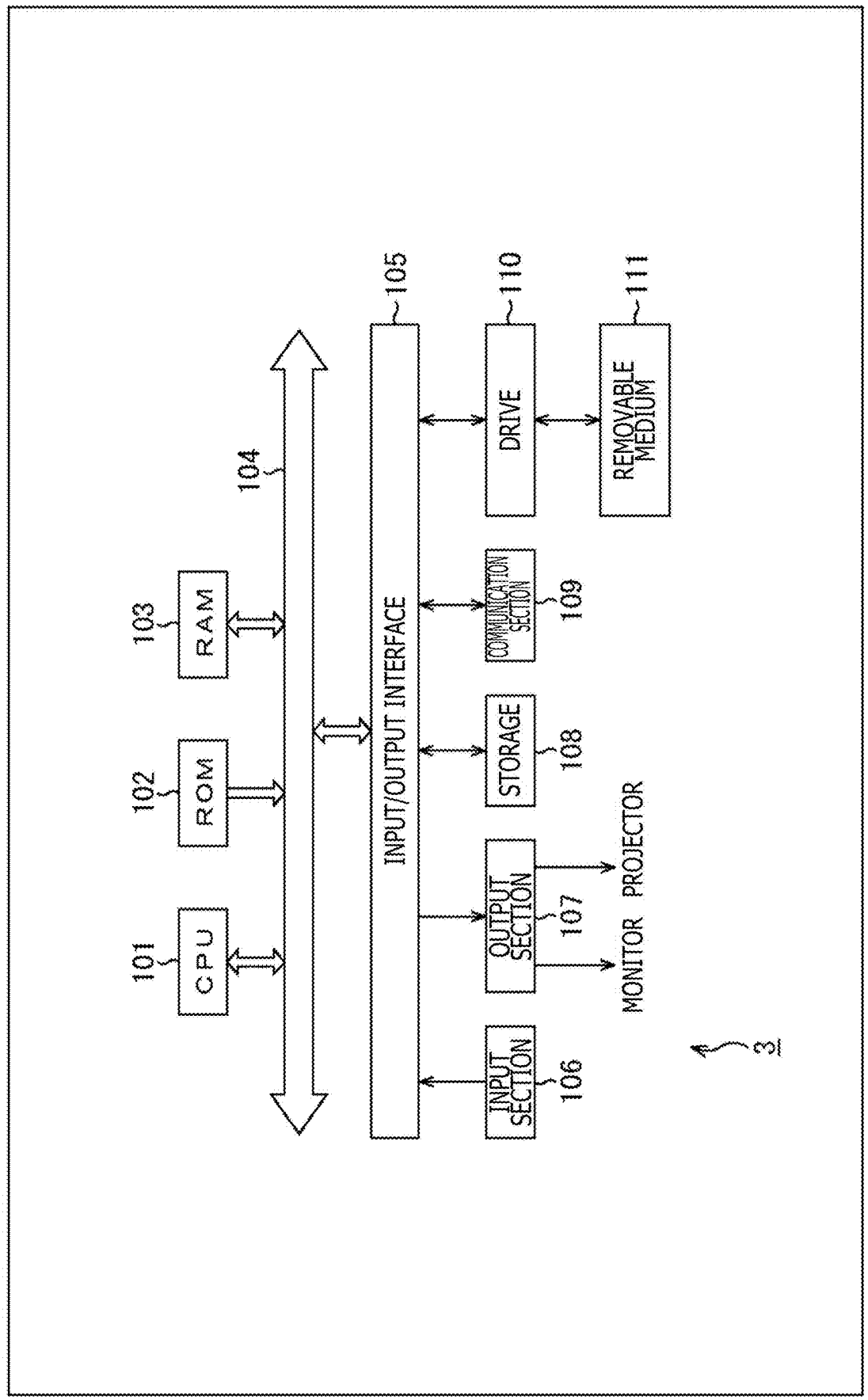
FIG. 8 is a block diagram illustrating a configuration example of hardware of an image processing device.

FIG. 8 is a block diagram illustrating a configuration example of hardware of the image processing device 3.

A CPU (Central Processing Unit) 101, a ROM (Read Only Memory) 102, and a RAM (Random Access Memory) 103 are mutually connected through a bus 104.

The bus 104 is further connected with an input/output interface 105. The input/output interface 105 is connected with an input section 106, an output section 107, a storage 108, a communication section 109, and a drive 110.

The input section 106 includes, for example, a keyboard and a mouse. The user (the administrator of the multi-projection system) operates the input section 106 to adjust the projection frontal position, for example.

The output section 107 causes a monitor to display an adjustment screen used to adjust the projection frontal position. Further, the output section 107 outputs the projection images to the projectors.

The storage 108 includes a hard disk or a nonvolatile memory, for example. The storage 108 stores various kinds of data such as a program that is executed by the CPU 101, in addition to the content.

The communication section 109 includes, for example, a network interface. The communication section 109 communicates with an external device through a network such as the Internet. The content reproduced by the multi-projection system may be provided through the network.

The drive 110 is a drive for a removable medium 111 such as a USB memory incorporating a semiconductor memory. The drive 110 writes data into the removable medium 111 and reads data stored in the removable medium 111.

Figure 9:
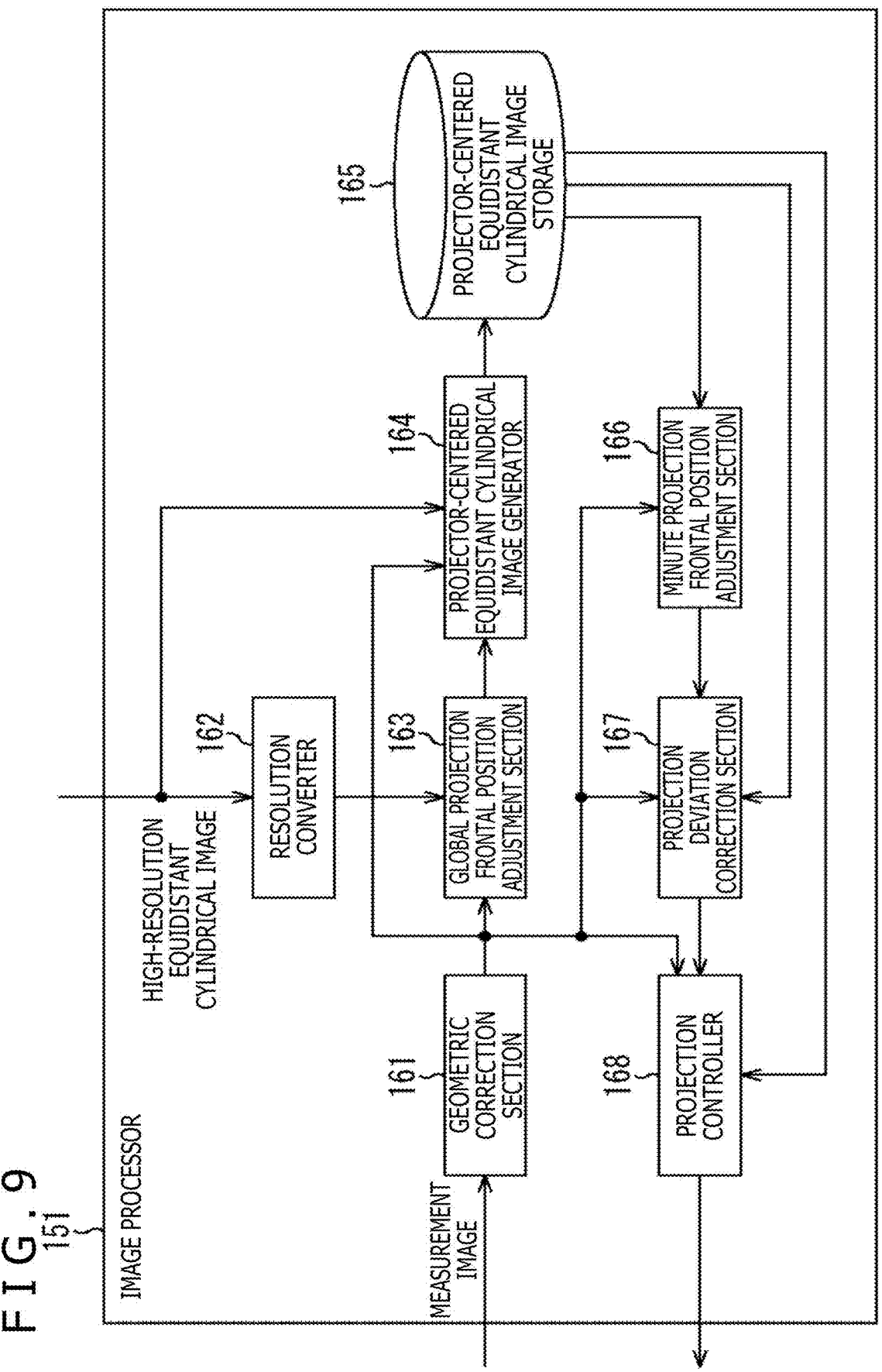
FIG. 9 is a block diagram illustrating a functional configuration example of the image processing device.

FIG. 9 is a block diagram illustrating a functional configuration example of the image processing device 3.

In the image processing device 3, the CPU 101 executes a predetermined program to implement an image processor 151.

The image processor 151 includes a geometric correction section 161, a resolution converter 162, a global projection frontal position adjustment section 163, a projector-centered equidistant cylindrical image generator 164, a projector-centered equidistant cylindrical image storage 165, a minute projection frontal position adjustment section 166, a projection deviation correction section 167, and a projection controller 168. A measurement image for geometric correction processing is input into the geometric correction section 161, and the high-resolution equidistant cylindrical image configuring the moving image of the content is input into the resolution converter 162 and the projector-centered equidistant cylindrical image generator 164.

The geometric correction section 161 acquires the measurement image obtained with measurement processing performed as pre-processing for projecting the moving image of the content. The measurement image is an image obtained in such a manner each projector projects a pattern image that is designed in advance on the projection surface 1A and a camera shoots the pattern image projected on the projection surface 1A. In the measurement image, a pattern projected by each projector is captured while being distorted depending on a position of the projection region.

The geometric correction section 161 associates coordinates of the pattern image with coordinates of the measurement image and solves a geometric problem (by obtaining parameters of geometric transformation) to generate geometric correction information. The geometric correction information is information regarding geometric correction vectors for associating pixels in the projection image of each projector with pixels in the high-resolution equidistant cylindrical image.

The geometric correction information is information according to the positional relationship between the projectors, the screen, and the point of view and is used to generate the projection image, for example. The geometric correction information generated with such automatic geometric correction processing is supplied to the global projection frontal position adjustment section 163, the projector-centered equidistant cylindrical image generator 164, the minute projection frontal position adjustment section 166, the projection deviation correction section 167, and the projection controller 168.

The resolution converter 162 performs resolution conversion on the high-resolution equidistant cylindrical image to generate a low-resolution equidistant cylindrical image that is an equidistant cylindrical image with low resolution. For example, by performing processing for achieving low resolution such as pixel thinning-out, the high-resolution equidistant cylindrical image of 22K (21600*10800 pixels) is converted to the low-resolution equidistant cylindrical image of 4K (4096*2160 pixels).

The low-resolution equidistant cylindrical image is used to adjust the projection frontal position. The low-resolution equidistant cylindrical image generated by the resolution converter 162 is supplied to the global projection frontal position adjustment section 163.

The global projection frontal position adjustment section 163 performs global projection frontal position adjustment processing that is processing that roughly adjusts the projection frontal position, based on the geometric correction information supplied from the geometric correction section 161 and the low-resolution equidistant cylindrical image supplied from the resolution converter 162. Projection frontal position information generated by the global projection frontal position adjustment processing is supplied to the projector-centered equidistant cylindrical image generator 164. Details of the global projection frontal position adjustment processing will be described later.

The projector-centered equidistant cylindrical image generator 164 generates projector-centered equidistant cylindrical images used to generate the projection images of the projectors, based on the high-resolution equidistant cylindrical image and the projection frontal position information supplied from the global projection frontal position adjustment section 163. To generate the projector-centered equidistant cylindrical images, the geometric correction information supplied from the geometric correction section 161 is also used.

As will be described later, the projector-centered equidistant cylindrical image is an image whose center pixel is equal to a center pixel of the projection region of each projector and that includes an angle range of the projection region. Since the projection is performed using 18 projectors, 18 projector-centered equidistant cylindrical images are generated from one high-resolution equidistant cylindrical image.

The projector-centered equidistant cylindrical images generated by the projector-centered equidistant cylindrical image generator 164 are supplied to the projector-centered equidistant cylindrical image storage 165 together with image generation parameters, to be stored. The image generation parameters serve as information used to generate the projection images based on the projector-centered equidistant cylindrical images.

The minute projection frontal position adjustment section 166 performs minute projection frontal position adjustment processing that is processing that performs fine adjustment of the projection frontal position. The minute projection frontal position adjustment processing is performed in a state in which the projectors project the projection images and the moving image is presented on the dome screen 1. The projection frontal position information generated by the minute projection frontal position adjustment processing is supplied to the projection deviation correction section 167. Details of the minute projection frontal position adjustment processing will be described later.

The projection deviation correction section 167 corrects projection deviation, based on the geometric correction vectors supplied from the minute projection frontal position adjustment section 166.

The correction of the projection deviation is processing that corrects existing geometric correction vectors according to the projection deviation. Hereinafter, the correction of the projection deviation is referred to as geometric re-correction vector generation processing as appropriate.

Each of geometric re-correction vectors generated with the geometric re-correction vector generation processing is a vector for associating a pixel in the projection image of each projector with a pixel in the projector-centered equidistant cylindrical image that has undergone the fine adjustment of the projection frontal position. Details of the geometric re-correction vector generation will be described later.

The geometric re-correction vector generation processing by the projection deviation correction section 167 is also performed at a timing when the positional relationship between the projectors, the screen, and the point of view is deviated and the automatic geometric correction processing is re-performed, for example. In a case where the automatic geometric correction processing is re-performed, the geometric correction section 161 supplies the geometric correction information including the geometric correction vectors to the projection deviation correction section 167.

The projection controller 168 reads the projector-centered equidistant cylindrical image and the image generation parameter stored in the projector-centered equidistant cylindrical image storage 165 to generate the projection image of each projector. To generate the projection image of each projector, the geometric correction information supplied from the geometric correction section 161 or the geometric re-correction vector supplied from the projection deviation correction section 167 is used.

For example, when projection for the minute projection frontal position adjustment processing is performed, the projection image is generated using the geometric correction information supplied from the geometric correction section 161. In a case where the minute projection frontal position adjustment processing and the geometric re-correction vector generation processing are terminated and therefore, the geometric re-correction vector is already generated, the projection image is generated using the geometric re-correction vector.

The projection controller 168 outputs the projection image to each projector to project the projection image on the dome screen 1.

<Whole Flow of Image Processing>

Figure 10:
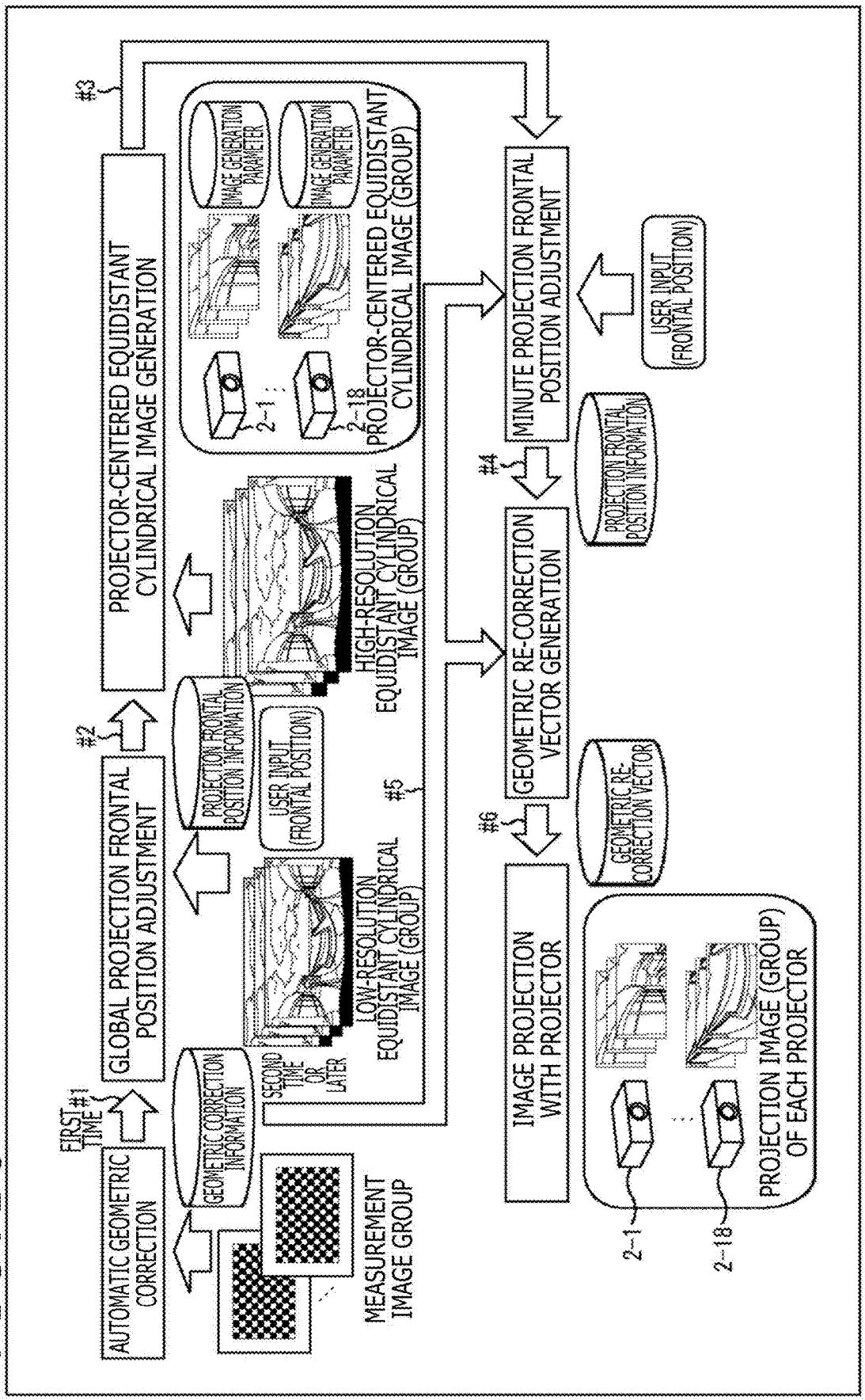
FIG. 10 is a diagram illustrating a whole flow of image processing.

FIG. 10 is a diagram illustrating a whole flow of image processing by the image processor 151.

As illustrated at an upper left part in FIG. 10, the geometric correction section 161 performs the automatic geometric correction processing using the measurement image as an input, and generates the geometric correction information. The automatic geometric correction processing is performed using a plurality of measurement images (measurement image group). Subsequent processing branches according to whether the automatic geometric correction processing to be performed at this time is first-time processing or second-time processing or later.

In a case where the automatic geometric correction processing to be performed at this time is the first-time processing, as illustrated ahead of a void arrow #1, the global projection frontal position adjustment section 163 performs global projection frontal position adjustment processing using the low-resolution equidistant cylindrical image. Information indicating contents input by the user who adjusts the projection frontal position while viewing an image displayed based on the low-resolution equidistant cylindrical image is also input to the global projection frontal position adjustment section 163.

As illustrated ahead of a void arrow #2, the projector-centered equidistant cylindrical image generator 164 performs projector-centered equidistant cylindrical image generation processing using projection frontal position information generated with the global projection frontal position adjustment processing and a high-resolution equidistant cylindrical image group. With the projector-centered equidistant cylindrical image generation processing, the projector-centered equidistant cylindrical image and the image generation parameter for each projector are generated.

As illustrated ahead of a void arrow #3, the minute projection frontal position adjustment section 166 performs minute projection frontal position adjustment processing. Information indicating contents input by the user who finely adjusts the projection frontal position while viewing an image projected on the dome screen 1 based on the projector-centered equidistant cylindrical images is also input to the minute projection frontal position adjustment section 166.

As illustrated ahead of a void arrow #4, the projection deviation correction section 167 performs the geometric re-correction vector generation processing. As described above, the geometric re-correction vector generation processing is performed based on the geometric correction vectors supplied from the minute projection frontal position adjustment section 166 or based on the geometric correction information supplied from the geometric correction section 161 by re-performing the automatic geometric correction processing.

In a case where the automatic geometric correction processing is performed for the second or subsequent time, as illustrated ahead of a void arrow #5, the global projection frontal position adjustment processing and the projector-centered equidistant cylindrical image generation processing are omitted, and the minute projection frontal position adjustment processing is performed next. A series of processing can also be performed from the geometric re-correction vector generation processing.

As illustrated ahead of a void arrow #6, the projection controller 168 generates the projection image of each projector, based on the projector-centered equidistant cylindrical image and the image generation parameter, and projects the generated image.

Hereinafter, each part of processing will be described.

<Projection Frontal Position Adjustment Processing>

To adjust the projection frontal position, the global projection frontal position adjustment processing using the low-resolution equidistant cylindrical image and the minute projection frontal position adjustment processing after the projector-centered equidistant cylindrical images are generated are performed in two stages.

Global Projection Frontal Position Adjustment Processing

Figure 11:
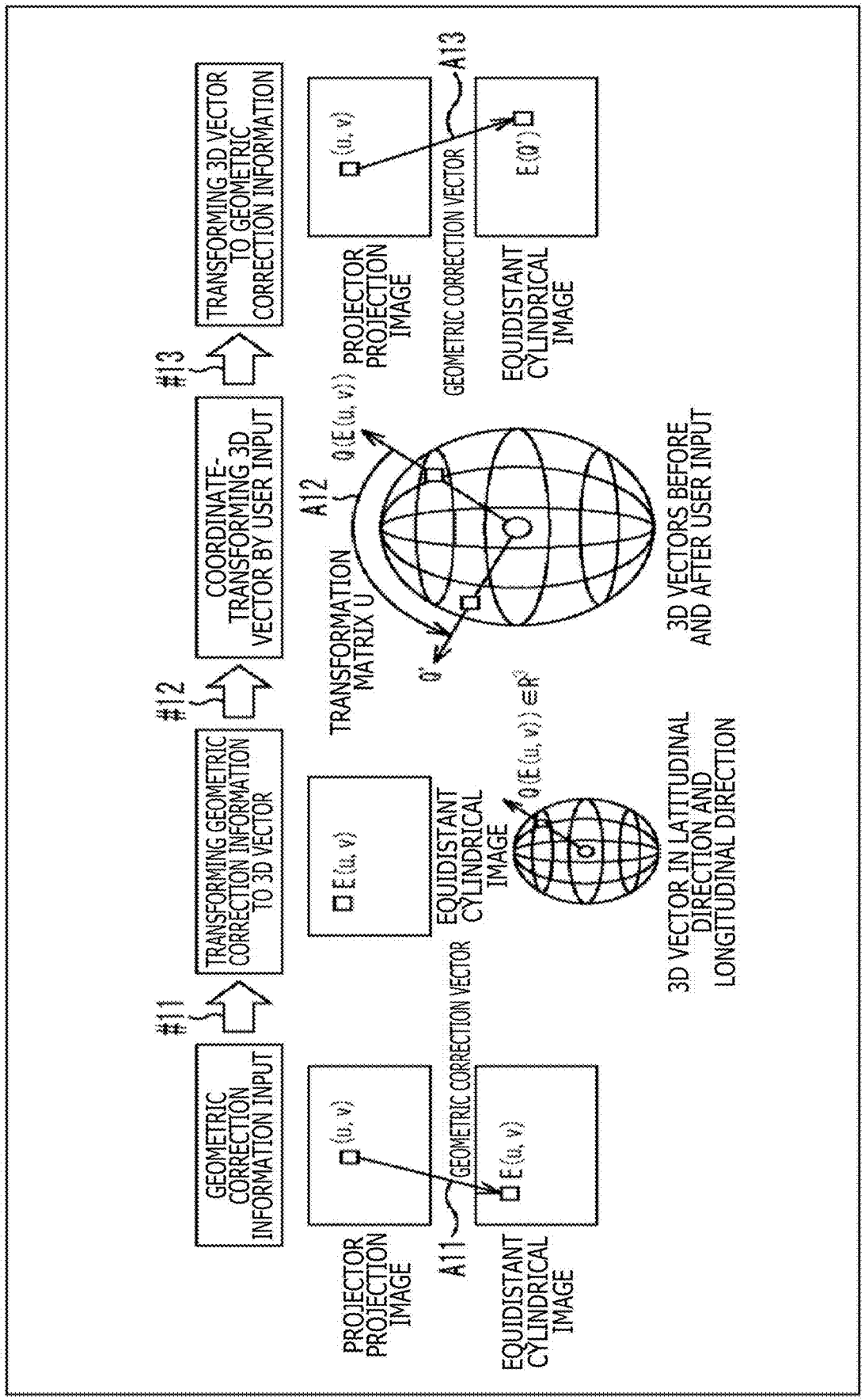
FIG. 11 is a diagram illustrating a flow of global projection frontal position adjustment processing.

FIG. 11 is a diagram illustrating a flow of the global projection frontal position adjustment processing.

As illustrated at a left end in FIG. 11, the geometric correction information generated with the automatic geometric correction processing is input to the global projection frontal position adjustment section 163. Each geometric correction vector included in the geometric correction information indicates a pixel E(u, v) serving as a reference destination on the high-resolution equidistant cylindrical image of each pixel (u, v) in the projection image as indicated by an arrow A11.

The equidistant cylindrical image input to the global projection frontal position adjustment section 163 is the low-resolution equidistant cylindrical image obtained through the resolution conversion. However, the pixels in the low-resolution equidistant cylindrical image correspond to the pixels in the high-resolution equidistant cylindrical image yet to be converted. The geometric correction vectors serve as information that associates the pixels in the projection image with the pixels in the high-resolution equidistant cylindrical image and associates the pixels in the projection image with the pixels in the low-resolution equidistant cylindrical image.

As illustrated ahead of a void arrow #11, the global projection frontal position adjustment section 163 transforms the geometric correction vectors included in the geometric correction information to 3D vectors Q.

Due to characteristics of the equidistant cylindrical image, a position of the pixel in the low-resolution equidistant cylindrical image corresponds to latitude and longitude (θ, φ), as described above. In a case where the pixel in the low-resolution equidistant cylindrical image is considered as a pixel on a sphere, the 3D vector Q is a vector indicating a direction of the pixel with a center of the sphere as a reference.

The latitude and longitude (θ, φ) of the pixel in the low-resolution equidistant cylindrical image corresponding to the pixel in the projection image are expressed by the following expressions (1) and (2), respectively.

[Math. 1]

$$\theta = 2\pi \frac{u}{equiWidth} - \pi \quad (1)$$

[Math. 2]

$$\phi = \pi \frac{v}{equiHeight} \quad (2)$$

In the expression (1), equiWidth is a width of the low-resolution equidistant cylindrical image, and in the expression (2), equiHeight is a height of the low-resolution equidistant cylindrical image.

The latitude and longitude (θ, φ) are transformed to the 3D vector Q by the following expression (3).

[Math. 3]

$$Q = (\sin \phi \sin \theta \; \cos \phi \; -\sin \phi \cos \theta) \quad (3)$$

Here, the adjustment screen used to adjust the projection frontal position is displayed on the monitor. On the adjustment screen, the low-resolution equidistant cylindrical image itself is displayed, or an image generated based on the low-resolution equidistant cylindrical image is displayed.

The user adjusts the projection frontal position using such a GUI (Graphical User Interface). Information indicating the projection frontal position that has undergone adjustment is supplied to the global projection frontal position adjustment section 163.

As illustrated ahead of a void arrow #12, the global projection frontal position adjustment section 163 performs coordinate transformation of the 3D vector Q according to a user input. A transformation matrix U used for the coordinate transformation is a matrix for modifying the projection frontal position and is expressed as a rotation matrix of the 3D vector Q as indicated by an arrow A12.

A 3D vector Q' reflecting the user input is expressed by the following expression (4). The 3D vector Q' expresses the latitude and longitude of the pixel in the low-resolution equidistant cylindrical image that has undergone adjustment of the projection frontal position.

[Math. 4]

$$Q' = U \cdot Q \quad (4)$$

Such a transformation matrix U used for transformation of the geometric correction vector indicating correspondence between the pixel in the projection image and the pixel in the equidistant cylindrical image is obtained for each pixel in the projection image and is supplied to the projector-centered equidistant cylindrical image generator 164 as the projection frontal position information.

As illustrated ahead of a void arrow #13, the global projection frontal position adjustment section 163 transforms the 3D vector Q' to the geometric correction vector and generates the geometric correction information that is information regarding the geometric correction vector after transformation. The transformation of the 3D vector Q' to the geometric correction vector is performed by inverse transformation using the above expressions (1) to (3).

As indicated by an arrow A13, the geometric correction vector after transformation is information for associating each pixel (u, v) in the projection image with the pixel E(u, v) in the low-resolution equidistant cylindrical image (high-resolution equidistant cylindrical image) that has undergone adjustment of the projection frontal position.

Minute Projection Frontal Position Adjustment Processing

The minute projection frontal position adjustment processing is performed in a state in which the projection images are projected from the projectors, and the moving image is presented on the dome screen 1. The user views the moving image presented on the dome screen 1 and performs fine adjustment of the projection frontal position.

A flow of the minute projection frontal position adjustment processing is basically the same as the flow of the global projection frontal position adjustment processing.

In other words, the geometric correction information generated with the automatic geometric correction processing is input to the minute projection frontal position adjustment section 166. The geometric correction vector included in the geometric correction information indicates the pixel E(u, v) serving as the reference destination on the high-resolution equidistant cylindrical image of each pixel (u, v) in the projection image.

Here, the high-resolution equidistant cylindrical image including the pixels E(u, v) is an image of a whole projection region (the region in the frame F1 in FIG. 4) generated based on the projector-centered equidistant cylindrical images of the projectors.

The minute projection frontal position adjustment section 166 transforms the geometric correction vector included in the geometric correction information to the 3D vector Q.

In addition, the minute projection frontal position adjustment section 166 performs the coordinate transformation of the 3D vector Q according to the input of the user who views the moving image projected on the dome screen 1. A range of the projection frontal position, which can be adjusted by the user, corresponds to a range of a margin region set on the projector-centered equidistant cylindrical image. The margin region set on the projector-centered equidistant cylindrical image will be described later.

Conceptually, the margin region is set around the whole projection region indicated by the frame F1 in FIG. 4, and the fine adjustment of the projection frontal position can be performed within a range of the whole projection region including the margin region.

The minute projection frontal position adjustment section 166 transforms the 3D vector Q' obtained through the coordinate transformation to the geometric correction vector and generates the geometric correction information that is information regarding the geometric correction vector that has undergone transformation. The geometric correction information generated with the minute projection frontal position adjustment processing and the transformation matrix U used for the coordinate transformation of the 3D vector Q are supplied to the projection deviation correction section 167 as the projection frontal position information.

As described above, in the image processor 151, adjustment of the projection frontal position is performed as two-stage processing. The adjustment of the projection frontal position is performed with the two stages, thereby achieving the following advantages.

(1) Even in a case where performance of the image processing device 3 is poor and the GPU cannot process the high-resolution equidistant cylindrical image such as 22K, the user can adjust the projection frontal position while viewing an image close to a final projection image, which is displayed based on the low-resolution image.

(2) Since the image displayed on the adjustment screen when the global projection frontal position adjustment processing is performed is an image displayed based on the low-resolution equidistant cylindrical image, the image processing device 3 can improve a drawing response. Since a state after adjustment is drawn with the improved response, even in a case where the user significantly adjusts the projection frontal position, the user can perform the adjustment quickly and easily.

(3) When an adjustment range is within a preset range of the margin region, the image processing device 3 can perform the fine adjustment of the projection frontal position without regenerating the images for the projectors (projector-centered equidistant cylindrical images).

<Projector-Centered Equidistant Cylindrical Image Generation Processing>

To achieve adjustment of the projection frontal position and correction of the projection deviation, as a division method for the images of the projectors, a method that has the characteristics of the equidistant cylindrical image and can correspond to a change in geometric correction information is required. The projector-centered equidistant cylindrical images are images that satisfy such requirement and are images made by dividing the high-resolution equidistant cylindrical image for the projectors with good data efficiency.

In the past, the processing that divides the equidistant cylindrical image has been used in various applications. For example, there is a service in which the equidistant cylindrical image is divided into tiles and only parts necessary for display are transmitted to and displayed on a user's side.

In a case where the equidistant cylindrical image is divided into the tiles, a data amount necessary to visualize a portion near a pole is large, thereby decreasing data transmission efficiency and processing efficiency. The projection regions of the projectors in the high-resolution equidistant cylindrical image are illustrated on the left side in FIG. 12. The projection regions of the projectors are the same as the regions explained with reference to FIG. 5.

Figure 12:
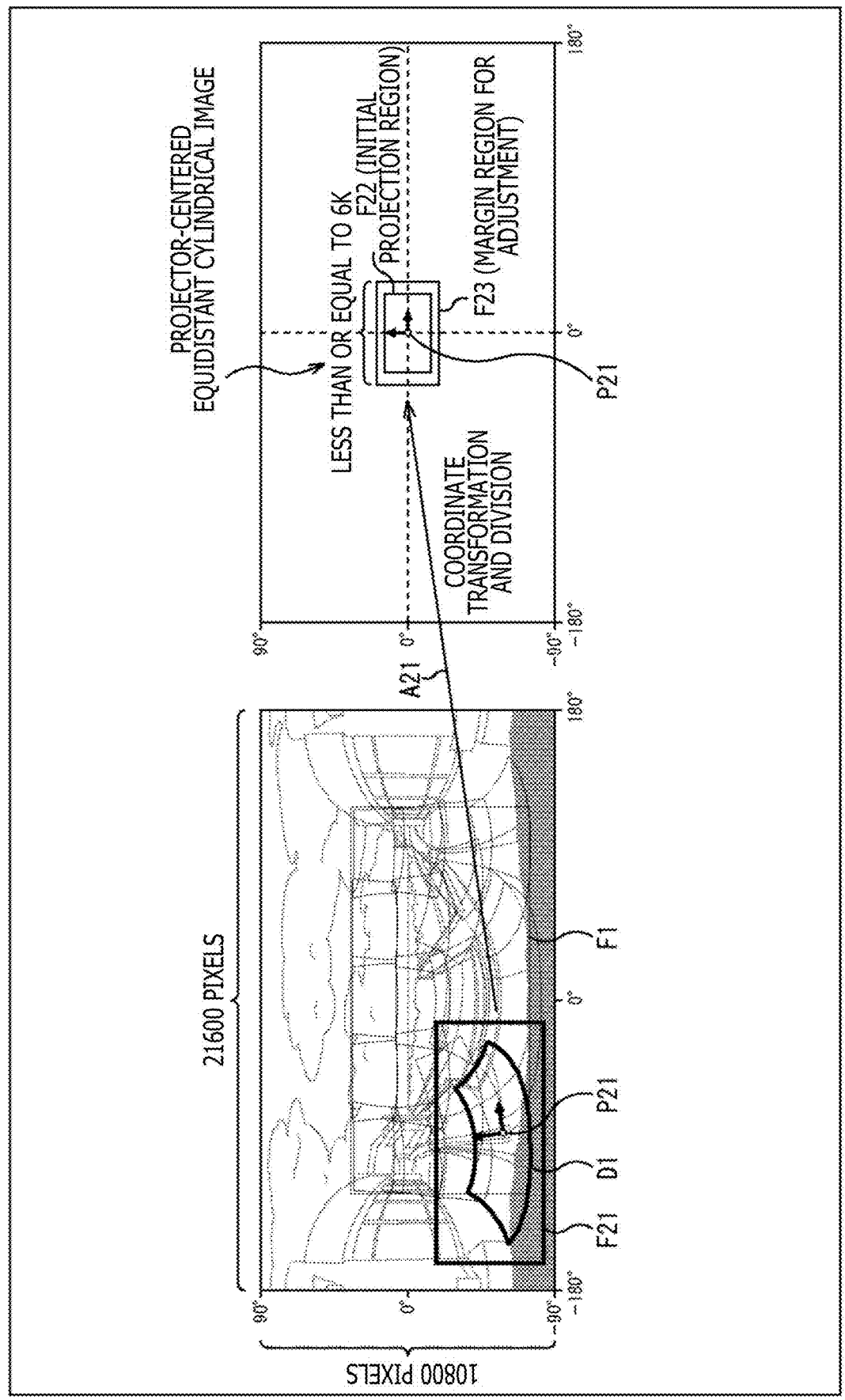
FIG. 12 is a diagram illustrating an example of a projector-centered equidistant cylindrical image.

As indicated by a bold line on the high-resolution equidistant cylindrical image on the left side in FIG. 12, a region D1 that is the projection region of the projector 2-16 that projects the image near the pole is extremely wide in comparison with the projection region of the projector that projects the image near the latitude of zero degrees.

Accordingly, if a tile region indicated while being surrounded by a frame F21 is extracted and provided as the image for the projector 2-16, whole throughput may be decreased. Further, due to an increase in size of data that needs to be retained, operation stability may be decreased.

To address those issues, in the image processor 151, as illustrated ahead of an arrow A21 in FIG. 12, the projector-centered equidistant cylindrical image that is an image that defines coordinates on the equidistant cylindrical image corresponding to a center (position P21) of the projection region of each projector as latitude of zero degrees and longitude of zero degrees and includes the range of the projection angle of each projector and the angle range of the margin is generated. In other words, such processing that the rectangular region indicated by the frame F21 is extracted to provide the image of each projector is not performed.

A region within a rectangular frame F22 illustrated on the right side in FIG. 12 is the region corresponding to the range of the projection angle of the projector 2-16. Further, a region outside the frame F22 but within a frame F23 is the margin region. Pixels in the margin region are used for the fine adjustment of the projection frontal position and the correction of the projection deviation.

The projector-centered equidistant cylindrical image is generated as an image having a pixel number less than or equal to 6K (6144*3072 pixels), for example. The pixel number of each projector-centered equidistant cylindrical image varies depending on the range of the projection angle.

The projector-centered equidistant cylindrical image including pixels of such a region is generated for each projector. The image processor 151 can perform division into images each of which has the characteristics as the equidistant cylindrical image, is capable of corresponding to a change in geometric correction information, and has good data efficiency per unit angle.

Figure 13:
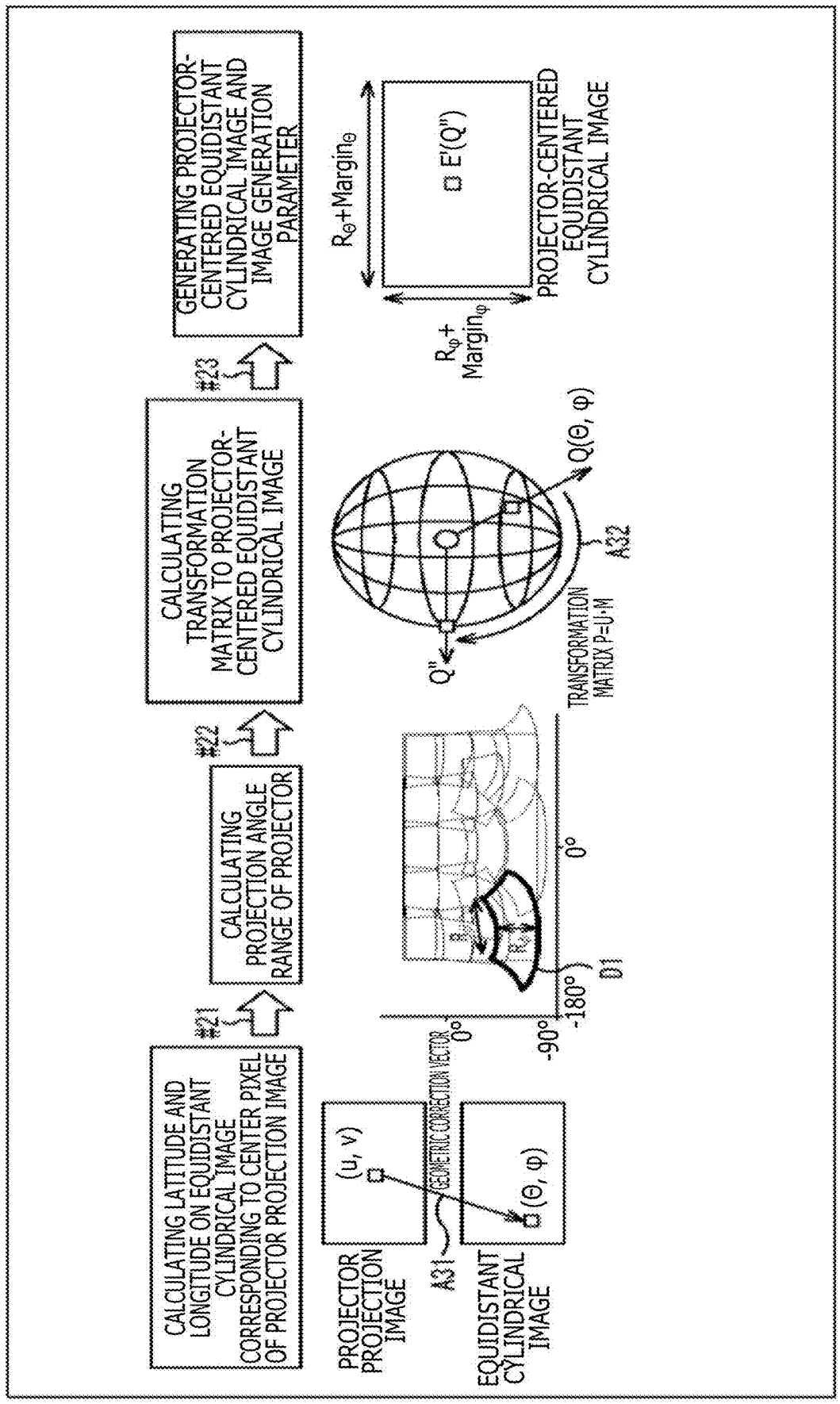
FIG. 13 is a diagram illustrating a flow of projector-centered equidistant cylindrical image generation processing.

FIG. 13 is a diagram illustrating a flow of the projector-centered equidistant cylindrical image generation processing.

For example, the projector-centered equidistant cylindrical image generation processing illustrated in FIG. 13 is performed sequentially focusing on each projector.

As illustrated at a left end in FIG. 13, the projector-centered equidistant cylindrical image generator 164 calculates latitude and longitude ($\theta$, $\varphi$) on the high-resolution equidistant cylindrical image corresponding to a center pixel of the projection image of the currently focusing projector, based on the geometric correction information supplied from the geometric correction section 161. The calculation of the latitude and longitude is performed based on the geometric correction vector of the center pixel of the projection image, which is included in the geometric correction information, and the above expressions (1) and (2). The geometric correction vector indicated by an arrow A31 is information representing correspondence between the center pixel of the projection image of the projector and the pixel in the high-resolution equidistant cylindrical image.

As illustrated ahead of a void arrow #21, the projector-centered equidistant cylindrical image generator 164 calculates the range of projection angle of each projector. The calculation of the range of projection angle is performed such that pixels at four corners of the projection image are transformed to latitude and longitude similar to the center pixel, and an angle range $R_\theta$ in a latitudinal direction and an angle range $R_\varphi$ in a longitudinal direction are calculated.

As illustrated ahead of a void arrow #22, the projector-centered equidistant cylindrical image generator 164 calculates a transformation matrix P for transforming the projection image to the projector-centered equidistant cylindrical image, based on the 3D vector Q corresponding to the center pixel of the projection image.

The 3D vector Q corresponding to the center of the projection image of the projector is obtained through the above expressions (1) to (3), based on the geometric correction vector of the center pixel of the projection image.

Furthermore, the transformation matrix P is obtained through the following expression (5).

[Math. 5]

$$P = U \cdot M \qquad (5)$$

The transformation matrix U in the expression (5) is a matrix for adjusting the projection frontal position according to the user input as described above. The transformation matrix U is specified by the projection frontal position information supplied from the global projection frontal position adjustment section 163.

Furthermore, a transformation matrix M is a matrix for transforming the center pixel of the projection image to the pixel of latitude of zero degrees and longitude of zero degrees on the projector-centered equidistant cylindrical image coordinates. The transformation matrix M is obtained through the following expression (6), based on latitude and longitude ($\theta$, $\varphi$) on the high-resolution equidistant cylindrical image corresponding to the center pixel of the projection image.

[Math. 6]

$$M = \begin{bmatrix} \cos\theta & \sin\varphi\sin\theta & \cos\varphi\sin\theta \\ 0 & \cos\varphi & -\sin\varphi \\ -\sin\theta & \cos\theta\sin\varphi & \cos\varphi\cos\theta \end{bmatrix} \qquad (6)$$

The adjustment of the projection frontal position is not considered for latitude and longitude ($\theta$, $\varphi$) on the high-resolution equidistant cylindrical image used for calculation of the transformation matrix M. The transformation matrix P is obtained by multiplying the transformation matrix M by the transformation matrix U representing contents of the adjustment of the projection frontal position.

As illustrated by an arrow A32, the projector-centered equidistant cylindrical image generator 164 transforms the 3D vector Q of each pixel in the high-resolution equidistant cylindrical image (whole projection region) to a 3D vector Q" representing coordinates on the projector-centered equidistant cylindrical image, based on the transformation matrix P. The transformation of the 3D vector Q is expressed by the following expression (7).

[Math. 7]

$$Q'' = P \cdot Q \qquad (7)$$

As illustrated ahead of a void arrow #23, the projector-centered equidistant cylindrical image generator 164 adds an angle range Margin $\theta$ serving as the margin to the angle range $R_\theta$ in the latitudinal direction and adds an angle range Margin $\varphi$ serving as the margin to the angle range $R_\varphi$ in the longitudinal direction. The projector-centered equidistant cylindrical image generator 164 generates the projector-centered equidistant cylindrical image including pixels within an angle range ($R_\theta$+Margin $\theta$, $R_\varphi$+Margin $\varphi$) among the pixels in the high-resolution equidistant cylindrical image indicated by the 3D vectors Q".

The projector-centered equidistant cylindrical image generator 164 stores, in the projector-centered equidistant cylindrical image storage 165, information representing the angle range ($R_\theta$, $R_\varphi$) and the transformation matrix M as the image generation parameter, together with the projector-centered equidistant cylindrical image. The image generation parameter is used for generating a projection image based on the projector-centered equidistant cylindrical image.

The series of processing as described above is performed sequentially focusing on each projector. The projector-centered equidistant cylindrical image storage 165 stores the projector-centered equidistant cylindrical image for each projector and the image generation parameter as a set.

Figure 14:
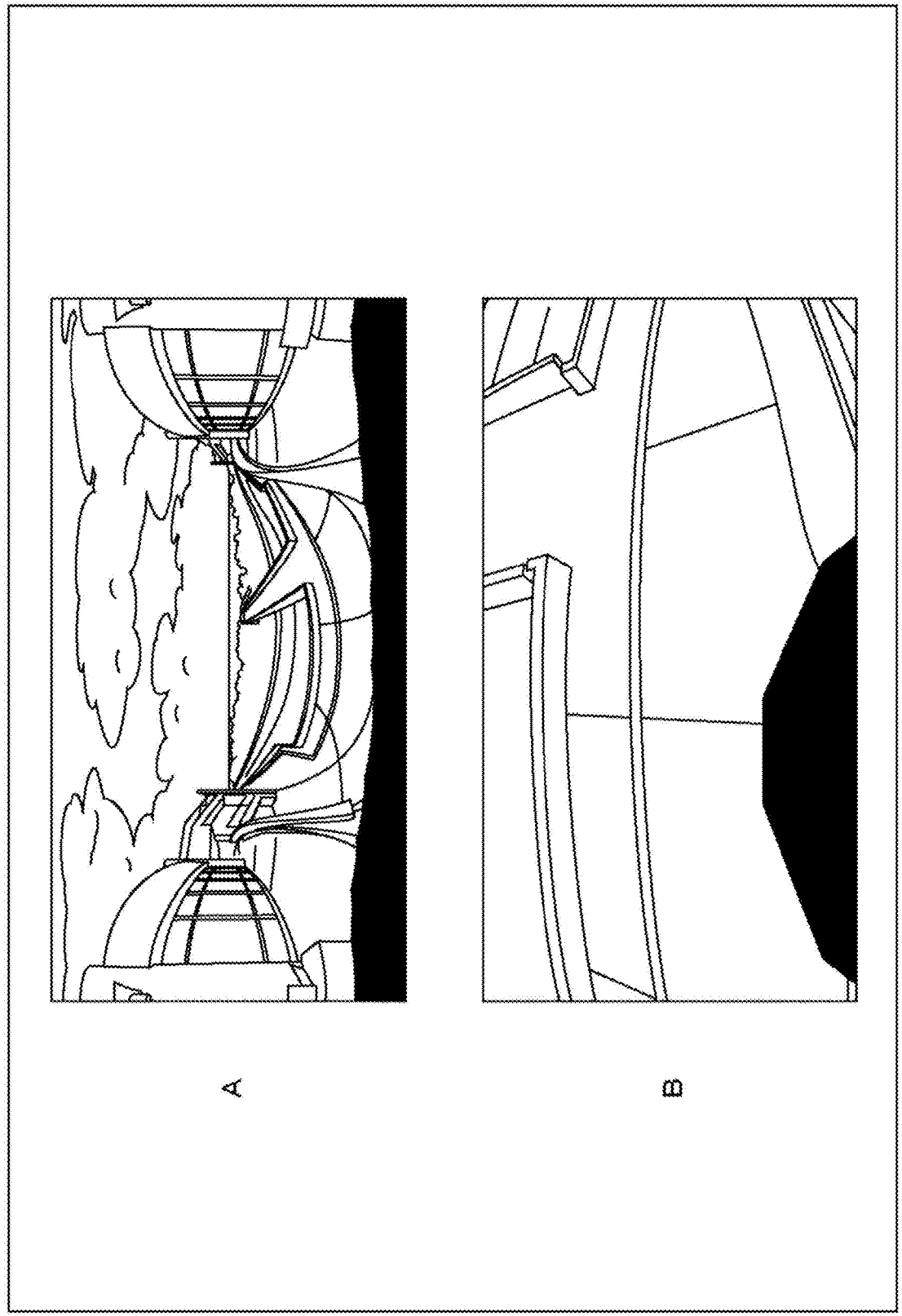
FIG. 14 depicts views illustrating an example of a high-resolution equidistant cylindrical image and the projector-centered equidistant cylindrical image.

FIG. 14 depicts views illustrating an example of the high-resolution equidistant cylindrical image and the projector-centered equidistant cylindrical image.

The projector-centered equidistant cylindrical image illustrated in part B of FIG. 14 is the projector-centered equidistant cylindrical image of the projector 2-17 (a projector to which the projection region near the region D2 in FIG. 5 is assigned) that is the projector projecting an image near the pole.

Note that the projector-centered equidistant cylindrical image illustrated in part B of FIG. 14 is an image in which, with respect to the angle range ($R_\theta$, $R_\varphi$) of the projection region of the projector 2-17, the margin region corresponding to 20 degrees is added to the angle range in the latitudinal direction and the margin region corresponding to 20 degrees is added to the angle range in the longitudinal direction. This allows the user to perform the fine adjustment of the projection frontal position within the range of the margin region corresponding to 20 degrees.

<Geometric Re-Correction Vector Generation Processing>

The geometric correction vector included in the geometric correction information generated with the automatic geometric correction processing is information for associating the pixel in the projection image of the projector with the pixel in the high-resolution equidistant cylindrical image including a whole range in latitude and longitude. To associate the pixel in the projection image of the projector with the pixel in the projector-centered equidistant cylindrical image, the geometric re-correction vector needs to be generated by transforming the geometric correction vector.

Figure 15:
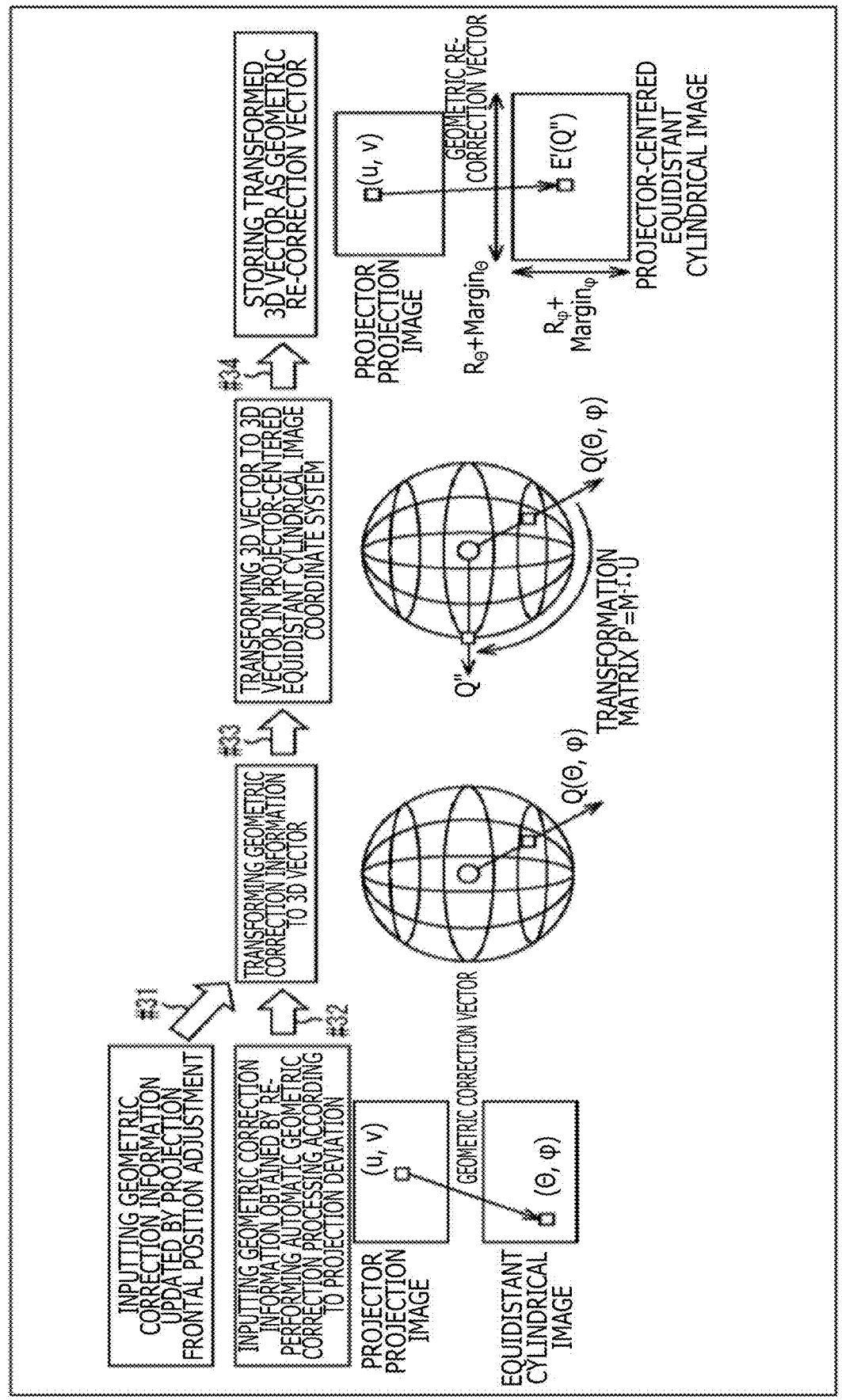
FIG. 15 is a diagram illustrating a flow of geometric re-correction vector generation processing.

FIG. 15 is a diagram illustrating a flow of geometric re-correction vector generation processing.

For example, the geometric re-correction vector generation processing in FIG. 15 is performed sequentially focusing on the projector-centered equidistant cylindrical image of each projector.

As illustrated at a left end in FIG. 15, the geometric correction information updated by the adjustment of the projection frontal position or the geometric correction information generated by re-performing the automatic geometric correction processing according to the projection deviation is input to the projection deviation correction section 167.

The former geometric correction information is generated by the minute projection frontal position adjustment processing and is supplied from the minute projection frontal position adjustment section 166 as the projection frontal position information. The geometric correction vector included in the geometric correction information updated by the adjustment of the projection frontal position is a vector for associating the pixel in the projection image of each projector with the pixel in the high-resolution equidistant cylindrical image that has undergone the fine adjustment of the projection frontal position.

The latter geometric correction information is supplied from the geometric correction section 161 when the positional relationship between the projectors, the screen, and the point of view is deviated and the automatic geometric correction processing is re-performed. The geometric correction vector included in the geometric correction information supplied when the automatic geometric correction processing is re-performed is a vector for associating the pixel in the projection image of each projector with the pixel in the high-resolution equidistant cylindrical image.

As illustrated ahead of void arrows #31 and #32, the projection deviation correction section 167 transforms the geometric correction vector included in the geometric correction information to the 3D vector Q. The 3D vector Q is obtained by the above expressions (1) to (3).

The projection deviation correction section 167 obtains a transformation matrix P' based on the transformation matrix M for the image generation parameter stored in the projector-centered equidistant cylindrical image storage 165 and the transformation matrix U obtained through the adjustment of the projection frontal position. The transformation matrix P' is expressed by the following expression (8).

[Math. 8]

$$P'=M^{-1} \cdot U \qquad (8)$$

Furthermore, as illustrated ahead of a void arrow #33, the projection deviation correction section 167 transforms the 3D vector Q to the 3D vector Q" in a projector-centered equidistant cylindrical image coordinate system, based on the transformation matrix P'. The 3D vector Q" is expressed by the following expression (9).

[Math. 9]

$$Q''=P' \cdot Q \qquad (9)$$

As illustrated ahead of a void arrow #34, the projection deviation correction section 167 outputs the 3D vector Q" obtained by the transformation to the projection controller 168, and stores the 3D vector Q" as the geometric re-correction vector.

The series of processing as described above is performed sequentially focusing on the projector-centered equidistant cylindrical image of each projector.

The projection controller 168 stores and manages the geometric re-correction vector supplied from the projection deviation correction section 167. The geometric re-correction vector is a vector for associating the pixel in the projection image of each projector with the pixel in the projector-centered equidistant cylindrical image that has undergone the projection deviation correction.

When the projection image is generated, in the projection controller 168, an image generated based on the projector-centered equidistant cylindrical image and the image generation parameter read from the projector-centered equidistant cylindrical image storage 165 is transformed based on the geometric re-correction vector to generate the projection image.

For example, an image including pixels included in the angle range ($R_\theta$, $R_\varphi$) included in the image generation parameter among the pixels in the projector-centered equidistant cylindrical image is transformed based on the geometric re-correction vector to generate the projection image.

The projection image is generated using the geometric re-correction vector. This makes it possible to deal with both the minute projection frontal position adjustment and the projection deviation correction. As described above, the geometric re-correction vector is the vector to be generated using the transformation matrix U obtained through the minute projection frontal position adjustment processing. The generation of the projection image using the geometric re-correction vector serves as processing including the minute projection frontal position adjustment in addition to the projection deviation correction.

<Operation of Image Processing Device>

With reference to a flowchart in FIG. 16, a series of image processing including the above processing will be described.

In step S1, the image processor 151 determines whether or not the projector-centered equidistant cylindrical image is already generated.

In a case where the image processor 151 determines that the projector-centered equidistant cylindrical image is not generated in step S1, the global projection frontal position adjustment section 163 performs the global projection frontal position adjustment processing in step S2. The processing described with reference to FIG. 11 is performed, thereby adjusting the projection frontal position.

In step S3, the projector-centered equidistant cylindrical image generator 164 performs the projector-centered equidistant cylindrical image generation processing. The processing described with reference to FIGS. 12 and 13 is performed, thereby generating the projector-centered equidistant cylindrical image of each projector.

In step S4, the minute projection frontal position adjustment section 166 performs the minute projection frontal position adjustment processing. The processing described with reference to FIG. 11 is performed, thereby performing the fine adjustment of the projection frontal position.

In step S5, the projection deviation correction section 167 performs the geometric re-correction vector generation processing. The processing described with reference to FIG. 15 is performed, thereby generating the geometric re-correction vector.

In step S6, the projection controller 168 transforms, based on the geometric re-correction vector, the image generated based on the projector-centered equidistant cylindrical image and the image generation parameter, to generate the projection image. The projection controller 168 outputs the projection image to each projector to be projected.

With this configuration, the moving image including the image within the predetermined range in the high-resolution equidistant cylindrical image is projected on the dome screen 1 in a form as indicated in FIG. 7.

On the other hand, in a case where the image processor 151 determines that the projector-centered equidistant cylindrical image is already generated in step S1, the image processor 151 determines whether or not to perform the fine adjustment of the projection frontal position in step S7.

In a case where the image processor 151 determines to perform the fine adjustment of the projection frontal position in step S7, the process proceeds to step S4 to perform the minute projection frontal position adjustment processing. After the minute projection frontal position adjustment processing is performed, the geometric re-correction vector generation processing is performed as appropriate, to generate the projection image.

On the other hand, in a case where the image processor 151 determines not to perform the fine adjustment of the projection frontal position in step S7, the process proceeds to step S8, and the image processor 151 determines whether or not to perform the projection deviation correction.

In a case where the image processor 151 determines to perform the projection deviation correction in step S8, the process proceeds to step S5 to perform the geometric re-correction vector generation processing. After the geometric re-correction vector generation processing is performed, the projection image is generated.

On the other hand, in a case where the image processor 151 determines not to perform the projection deviation correction in step S8, the process proceeds to step S6 to generate and project the projection image.

As described above, after the projector-centered equidistant cylindrical image is generated, the user can perform the fine adjustment of the projection frontal position and can also perform the projection deviation correction.

In other words, as illustrated in FIG. 17 as a flow of the existing processing, in a case where a projection image of each projector is directly generated from a high-resolution equidistant cylindrical image, when projection frontal position adjustment or projection deviation correction is performed after the projection image is generated, the projection image needs to be re-generated.

The projector-centered equidistant cylindrical image including the margin is generated as what is generally called an intermediate image that serves as a source of generation of the projection image of each projector. This allows the projection frontal position adjustment or the projection deviation correction to be performed without such image re-generation.

In addition, the pixels used to generate the projector-centered equidistant cylindrical image are only the pixels within the angle range in which the angle range of the margin is added to the angle range of the projection region. Therefore, data transmission efficiency and processing efficiency can be improved. For example, in a case where the image of each projector is provided by extracting a rectangular region from the high-resolution equidistant cylindrical image, an image of a projector to which the projection region near the pole is assigned particularly includes many unnecessary pixels, but such disadvantage can be prevented with this configuration.

Other Examples

The processing using the projector-centered equidistant cylindrical image is assumed to be performed as the processing for projecting the moving image in the multi-projection system. However, the processing using the projector-centered equidistant cylindrical image is also applicable to a system that divides the equidistant cylindrical image to transmit it.

The projection surface 1A of the dome screen 1 is assumed to have a dome shape of a substantial hemisphere. However, a curved surface having various curvatures and field angles can be adopted as the shape of the projection surface 1A.

For example, a line of sight of an observer is detected, head tracking is performed, and then the projection range may be controlled according to the line of sight.

The functional sections in the image processor 151 may be implemented by a plurality of PCs such that, among functional sections in the image processor 151 illustrated in FIG. 9, some functional sections are implemented by a predetermined PC and other functional sections are implemented by another PC.

The functional sections in the image processor 151 may be implemented by a server on the Internet, and the moving image may be projected based on data transmitted from the server.

The series of processing described above can be performed by hardware or by software. In a case where the series of processing is performed by software, a program configuring the software is installed on, for example, a computer embedded in dedicated hardware, or a general-purpose personal computer, from a recording medium for the program.

For example, a program to be executed by the CPU 101 is installed in the storage 108 while being recorded in the removable medium 111, or while being provided through a wired or wireless transmission medium such as a local area network, the Internet, or digital broadcasting.

Note that the program to be executed by the computer may be a program in which the processes are performed in time series in order described in this specification or may be a program in which the processes are performed in parallel or at a required timing, for example, when a call is issued.

In this specification, a system means a set of a plurality of components (e.g., devices and modules (parts)), regardless of whether or not all components are included in an identical housing. Accordingly, both plural devices that is housed in separate housings and is connected via a network and one device in which a plurality of modules is housed in one housing are referred to as the system.

Note that effects described in this specification is illustration in nature, and other effects may be achieved.

The exemplary embodiment of the present technology is not limited to the above-described exemplary embodiment, and can variously be modified without departing from the gist of the present technology.

For example, the present technology can adopt a configuration of cloud computing in which a plurality of devices shares and jointly processes one function via a network.

Each step explained in the above-described flowchart can be performed by one device or can be performed by plural devices by sharing.

Furthermore, in a case where one step includes plural processes, the plurality of processes included in the one step can be performed by one device, or can be performed by plural devices by sharing.

The present technology can also adopt the following configurations.

(1)

An image processing device including:

a generator that generates a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors.

(2)

The image processing device according to the item (1), further including:

a first projection frontal position adjustment section that adjusts a projection frontal position, in which the generator generates the second equidistant cylindrical image, based on the each of the projection regions in the first equidistant cylindrical image after adjustment of the projection frontal position.

(3)

The image processing device according to the item (2), further including:

a resolution converter that generates a low-resolution equidistant cylindrical image by lowering resolution of the first equidistant cylindrical image, in which the first projection frontal position adjustment section generates first transformation information used for transformation of geometric correction information indicating correspondence between a pixel in the projection images and a pixel in the first equidistant cylindrical image, according to the projection frontal position adjusted using a display of the low-resolution equidistant cylindrical image.

(4)

The image processing device according to the item (3), in which the generator generates the second equidistant cylindrical image including pixels in an angle range in which a predetermined angle range serving as a margin is added to an angle range of the each of the projection regions.

(5)

The image processing device according to the item (4), in which the generator generates an image generation parameter including second transformation information for transforming a center pixel of the each of the projection images to the center pixel of the second equidistant cylindrical image and information indicating the angle range of the second equidistant cylindrical image.

(6)

The image processing device according to the item (5), further including:

a storage that stores the second equidistant cylindrical image of the each of plural projectors together with the image generation parameter.

(7)

The image processing device according to the item (6), further including:

a projection controller that generates the each of the projection images, based on the second equidistant cylindrical image and the image generation parameter, and causes the each of the plural projectors to project the each of the projection images.

(8)

The image processing device according to the item (7), in which the projection controller projects the projection images on a screen having a curved projection surface.

(9)

The image processing device according to the item (7) or (8), further including:

a second projection frontal position adjustment section that adjusts the projection frontal position within a range of the margin, based on an operation to be performed in a state in which the projection images are projected.

(10)

The image processing device according to the item (9), in which the second projection frontal position adjustment section generates geometric correction information indicating correspondence between the pixel in the each of the projection images and the pixel in the first equidistant cylindrical image, according to the projection frontal position adjusted within the range of the margin.

(11)

The image processing device according to the item (10), further including:

a correction section that generates geometric re-correction information indicating correspondence between the pixel in the each of the projection images and a pixel in the second equidistant cylindrical image, based on the geometric correction information generated by the second projection frontal position adjustment section.

(12)

The image processing device according to the item (11), in which the correction section generates the geometric re-correction information, based on the first transformation information and the second transformation information.

(13)

An image processing method including:

by an image processing device, generating a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors.

(14)

A program causing a computer to perform a process of:

generating a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors.

(15)

A projection system including:

a screen having a curved projection surface;

plural projectors that projects projection images generated by an image processing device on the screen; and the image processing device including a generator that generates a second equidistant cylindrical image whose center pixel is equal to a center pixel of each of projection regions of plural projectors in a first equidistant cylindrical image and that includes pixels within an angle range including the each of the projection regions, as an image used to generate each of the projection images that are projected from the plural projectors, and a projection controller that generates the projection images, based on the second equidistant cylindrical image and an image generation parameter including transformation information for transforming a center pixel of the each of the projection images to the center pixel of the second equidistant cylindrical image and information indicating an angle range of the second equidistant cylindrical image, and causes the plural projectors to project the projection images, respectively.

REFERENCE SIGNS LIST

1 Dome screen, 2-1 to 2-7 Projector, 3 Image processing device, 151 Image processor, 161 Geometric correction section, 162 Resolution converter, 163 Global projection frontal position adjustment section, 164 Projector-centered equidistant cylindrical image generator, 165 Projector-centered equidistant cylindrical image storage, 166 Minute projection frontal position adjustment section, 167 Projection deviation correction section, 168 Projection controller

The invention claimed is:

1. An image processing device comprising:
a generator configured to generate a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors;
a resolution converter configured to generate a low-resolution equidistant cylindrical image by lowering resolution of the first equidistant cylindrical image; and
a first projection frontal position adjustment section configured to adjust a projection frontal position using a display of the low-resolution equidistant cylindrical image,
wherein the generator is further configured to generate the second equidistant cylindrical image, based on the each of the projection regions in the first equidistant cylindrical image after adjustment of the projection frontal position, and
wherein the generator, the resolution converter, and the first projection frontal position adjustment section are each implemented via at least one processor.

2. The image processing device according to claim 1, wherein the first projection frontal position adjustment section is further configured to generate first transformation information used for transformation of geometric correction information indicating correspondence between a pixel in the projection images and a pixel in the first equidistant cylindrical image, according to the projection frontal position adjusted using a display of the low-resolution equidistant cylindrical image.

3. The image processing device according to claim 2, wherein the generator is further configured to generate the second equidistant cylindrical image including pixels in an angle range in which a predetermined angle range serving as a margin is added to an angle range of the each of the projection regions.

4. The image processing device according to claim 3, wherein the generator is further configured to generate an image generation parameter including second transformation information for transforming a center pixel of the each of the projection images to the center pixel of the second equidistant cylindrical image and information indicating the angle range of the second equidistant cylindrical image.

5. The image processing device according to claim 4, further comprising:
a storage configured to store the second equidistant cylindrical image of the each of the plural projectors together with the image generation parameter,
wherein the storage is implemented via at least one processor.

6. The image processing device according to claim 5, further comprising:
a projection controller configured to generate the each of the projection images, based on the second equidistant cylindrical image and the image generation parameter, and cause the each of the plural projectors to project the each of the projection images,
wherein the projection controller is implemented via at least one processor.

7. The image processing device according to claim 6, wherein the projection controller is further configured to project the projection images on a screen having a curved projection surface.

8. The image processing device according to claim 6, further comprising:
a second projection frontal position adjustment section configured to adjust the projection frontal position within a range of the margin, based on an operation to be performed in a state in which the projection images are projected,
wherein the second projection frontal position adjustment section is implemented via at least one processor.

9. The image processing device according to claim 8, wherein the second projection frontal position adjustment section is further configured to generate geometric correction information indicating correspondence between the pixel in the each of the projection images and the pixel in the first equidistant cylindrical image, according to the projection frontal position adjusted within the range of the margin.

10. The image processing device according to claim 9, further comprising:
a correction section configured to generate geometric re-correction information indicating correspondence between the pixel in the each of the projection images and a pixel in the second equidistant cylindrical image, based on the geometric correction information generated by the second projection frontal position adjustment section.

11. The image processing device according to claim 10, wherein the correction section is further configured to generate the geometric re-correction information, based on the first transformation information and the second transformation information.

12. An image processing method comprising:
by an image processing device
generating a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors;

generating a low-resolution equidistant cylindrical image by lowering resolution of the first equidistant cylindrical image; and adjusting a projection frontal position using a display of the low-resolution equidistant cylindrical image, wherein the generation of the second equidistant cylindrical image is based on the each of the projection regions in the first equidistant cylindrical image after adjustment of the projection frontal position.

13. A non-transitory computer-readable medium having embodied thereon a program, which when executed by a computer causes the computer to execute an image processing method, the method comprising:

generating a second equidistant cylindrical image whose center pixel is equal to a center pixel of each of projection regions of plural projectors in a first equidistant cylindrical image and that includes pixels within an angle range including the each of the projection regions, as an image used to generate each of projection images that are projected from the plural projectors;

generating a low-resolution equidistant cylindrical image by lowering resolution of the first equidistant cylindrical image; and adjusting a projection frontal position using a display of the low-resolution equidistant cylindrical image, wherein the generation of the second equidistant cylindrical image is based on the each of the projection regions in the first equidistant cylindrical image after adjustment of the projection frontal position.

14. A projection system comprising:

a screen having a curved projection surface;

plural projectors configured to project projection images generated by an image processing device on the screen; and the image processing device including a generator configured to generate a second equidistant cylindrical image whose center pixel is equal to a center pixel of each of projection regions of plural projectors in a first equidistant cylindrical image and that includes pixels within an angle range including the each of the projection regions, as an image used to generate each of the projection images that are projected from the plural projectors, a resolution converter configured to generate a low-resolution equidistant cylindrical image by lowering resolution of the first equidistant cylindrical image, a first projection frontal position adjustment section configured to adjust a projection frontal position using a display of the low-resolution equidistant cylindrical image, wherein the generator is further configured to generate the second equidistant cylindrical image, based on the each of the projection regions in the first equidistant cylindrical image after adjustment of the projection frontal position, and a projection controller configured to generate the projection images based on the second equidistant cylindrical image and an image generation parameter including transformation information for transforming a center pixel of the each of the projection images to the center pixel of the second equidistant cylindrical image and information indicating an angle range of the second equidistant cylindrical image, and cause the plural projectors to project the projection images, respectively, wherein the generator, the resolution converter, the first projection frontal position adjustment section, and the projection controller are each implemented via at least one processor.

* * * * *